(12) United States Patent
Ogawa et al.

(10) Patent No.: US 10,848,736 B2
(45) Date of Patent: Nov. 24, 2020

(54) ELECTRONIC APPARATUS EQUIPPED WITH DETACHABLE IMAGE PICKUP APPARATUSES, IMAGE PICKUP APPARATUS, CONTROL METHOD FOR ELECTRONIC APPARATUS, AND STORAGE MEDIUM STORING CONTROL PROGRAM FOR ELECTRONIC APPARATUS

(71) Applicant: CANON KABUSHIKI KAISHA, Tokyo (JP)

(72) Inventors: Toshihiro Ogawa, Tokyo (JP); Kiyoshi Nitto, Saitama (JP); Yosuke Fukai, Kawasaki (JP); Junichiro Iwamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 15/928,638

(22) Filed: Mar. 22, 2018

(65) Prior Publication Data

US 2018/0278915 A1   Sep. 27, 2018

(30) Foreign Application Priority Data

Mar. 27, 2017 (JP) .................................. 2017-061112

(51) Int. Cl.
*H04N 5/225* (2006.01)
*H04N 13/167* (2018.01)
(Continued)

(52) U.S. Cl.
CPC .......... *H04N 13/167* (2018.05); *G06T 7/593* (2017.01); *H04N 5/2258* (2013.01);
(Continued)

(58) Field of Classification Search
CPC ..................................................... H04N 5/2258
(Continued)

(56) References Cited

U.S. PATENT DOCUMENTS 7,102,686 B1 * 9/2006 Orimoto ................. G03B 35/08
348/375
7,961,234 B2 * 6/2011 Viinikanoja ......... H04N 13/239
348/264

(Continued)

FOREIGN PATENT DOCUMENTS

JP    3792832 B2   7/2006
JP    4448844 B2   4/2010

*Primary Examiner* — Anthony J Daniels
(74) *Attorney, Agent, or Firm* — Carter, DeLuca & Farrell LLP

(57) ABSTRACT

An electronic apparatus that is capable of obtaining a correct base length even if at least one of photographing modules is attached to any slot different from an original slot at any timing. First and second photographing modules are respectively attached to any two of attachment regions of a body of the electronic apparatus. A photographing unit photographs in a compound eye mode using the photographing modules. An obtaining unit obtains two pieces of coordinate information about optical axes of the photographing modules from the photographing modules. A storage unit stores positional information about the attachment regions. A calculation unit calculates a base length by obtaining the coordinate information about the optical axes and the positional information about the attachment regions in a case where one of a state of the photographing modules and a state of the body of the electronic apparatus changes.

13 Claims, 15 Drawing Sheets

FRONT VIEW

BACK VIEW

(51) Int. Cl.
  *H04N 5/232*   (2006.01)
  *G06T 7/593*   (2017.01)
  *H04N 13/128*  (2018.01)
  *H04N 5/247*   (2006.01)
  *H04N 13/00*   (2018.01)

(52) U.S. Cl.
  CPC ..... *H04N 5/23212* (2013.01); *H04N 5/23229* (2013.01); *H04N 5/23238* (2013.01); *H04N 5/23241* (2013.01); *H04N 5/23245* (2013.01); *H04N 5/232941* (2018.08); *H04N 5/247* (2013.01); *H04N 13/128* (2018.05); *H04N 2013/0081* (2013.01)

(58) Field of Classification Search
  USPC .............................................. 348/218.1, 375
  See application file for complete search history.

(56) References Cited

U.S. PATENT DOCUMENTS

| | | | |
|---:|:---:|:---|:---|
| 9,565,416 B1 * | 2/2017 | Lewkow | H04N 5/23212 |
| 2008/0117316 A1 * | 5/2008 | Orimoto | H04N 5/2251 |
| | | | 348/240.3 |
| 2010/0194860 A1 * | 8/2010 | Mentz | H04M 1/0264 |
| | | | 348/47 |
| 2012/0149432 A1 * | 6/2012 | Lablans | H04N 5/775 |
| | | | 455/556.1 |
| 2015/0181006 A1 * | 6/2015 | Li | H04M 1/0264 |
| | | | 455/575.1 |
| 2018/0278829 A1 | 9/2018 | Fukai et al. | |

\* cited by examiner

FRONT VIEW

BACK VIEW

FRONT VIEW

BACK VIEW

FRONT VIEW

BACK VIEW

BACK VIEW

FRONT VIEW

ELECTRONIC APPARATUS EQUIPPED WITH DETACHABLE IMAGE PICKUP APPARATUSES, IMAGE PICKUP APPARATUS, CONTROL METHOD FOR ELECTRONIC APPARATUS, AND STORAGE MEDIUM STORING CONTROL PROGRAM FOR ELECTRONIC APPARATUS

BACKGROUND OF THE INVENTION

Field of the Invention

The present invention relates to an electronic apparatus equipped with detachable image pickup apparatuses as modules, the image pickup apparatus, a control method for the electronic apparatus, and a storage medium storing a control program for the electronic apparatus.

Description of the Related Art

There is a well-known electronic apparatus called a smart device that achieves various desired functions by combining modules that are collected for functional units like blocks. Such a smart device consists of a body that has a plurality of slots and a plurality of modules that have different functions. These various modules are attached to the slots of the body in a free combination. Attachment of a photographing module to a slot of the body enables a photographing function by running an application program installed on an OS.

There are various photographing modules corresponding to such a smart device. Focal length of an optical lens and size of an image sensor of a photographing module may be freely selected as long as certain standards, such as an attachment means and a communication means, are satisfied. Furthermore, a plurality of manufacturers, such as camera manufacturers and electronic manufacturers, may design these photographing modules. Moreover, since there are few restrictions about arrangements of components in a photographing module, degree of freedom of design is high. Accordingly, a photographing module can be designed with the optimal layout that is convenient for specification and a manufacturer.

Since a combination of modules is relatively free as mentioned above, a plurality of photographing modules can be attached to different slots, respectively. In such a case, image composite functions and measurement functions, which are well known functions of what is called a compound eye camera, become available by running an application program that activates a compound eye camera function for the attached photographing modules.

Well-known image composite functions, such as a stereoscopic view mode, panorama mode, pan-focus mode, dynamic range expansion mode, Charlot focus mode, and multi-zoom (high resolution) mode, are installed in a compound eye camera (see Japanese Patent No. 4448844 (JP4448844B), for example). Each of the functions obtains one image by compositing a plurality of image data obtained by photographing simultaneously while matching or differentiating photographing conditions of the respective photographing modules. Moreover, a distance measurement function is one of the measurement functions that use a compound eye camera (see Japanese Patent No. 3792832 (JP3792832B), for example). The function processes a stereo image obtained by photographing an object with right and left cameras simultaneously to recognize the object three-dimensionally or to measure a distance to the object.

Such image composite functions and measurement functions of a compound eye camera are achieved on the basis of parallax information between at least two photographing modules. Accordingly, it is important to obtain a distance (i.e. a base length) between the optical axes of the photographing modules. Accordingly, JP4448844B discloses a technique that specifies positions and postures of photographing modules by specifying connection parts that detect the photographing modules electrically from among a plurality of connection parts provided in a body. Simultaneously, the base length is obtained by determining types of the connected photographing modules between two types on the basis of detected signals.

JP3792832B discloses right and left cameras that are arranged in parallel at a predetermined gap. When the positions of the cameras are deviated due to secular change in a process to be used, a stereo image processor corrects one set of photographed image data. In this correction, the images photographed with the two cameras are geometrically converted with a conversion value that is beforehand set up corresponding to deviation between the images. At the same time, images equivalent to images that will be photographed in a state where base length is correctly adjusted are obtained by linear interpolation of the images converted.

Incidentally, the configuration disclosed in JP4448844B needs registering the information about a type of a photographing module and a position of an optical axis in the module beforehand into a memory built in the body. However, the optimal position of the optical axis may differ depending on the type of the photographing module in the above-mentioned smart device. In addition, since there are many manufacturers for a photographing module, it is difficult to register the information about all types of photographing modules into the memory in the body in advance. For example, when a user newly purchases a photographing module of a different type from existing modules and attaches it to a smart device already owned, the user is required to register information about the new photographing module to the memory in the body using some means, such as update.

Moreover, the control described in JP3792832B assumes relatively minute deviation that occurs in secular change. When the user changes a slot equipped with a photographing module in the above-mentioned smart device in contrast, a position of an optical axis will move, and a change amount of the base length becomes relatively large. Accordingly, it is not easy to detect a point of agreement from two images and to obtain correct parallax information. For example, when the change amount of the base length exceeds a correctable range, the correct conversion process will not be performed, which spoils reliability of a distance measurement result. Even if the correctable range is enlarged according to a relatively large change amount, much memory capacity is needed, and also time lag occurs before starting focusing or exposure because the scale of the calculation that detects a point of agreement from two images becomes large and calculation time becomes long.

SUMMARY OF THE INVENTION

The present invention provides an electronic apparatus, an image pickup apparatus, a control method for the electronic apparatus, and a storage medium storing a control program for the electronic apparatus, which are capable of obtaining a correct base length even if at least one of a plurality of photographing modules is attached to any slot different from an original slot at any timing.

Accordingly, a first aspect of the present invention provides an electronic apparatus including first and second photographing modules that are respectively attached to any two of attachment regions of a body of the electronic apparatus, a photographing unit configured to photograph in a compound eye mode using the first and second photographing modules, an obtaining unit configured to obtain two pieces of coordinate information about optical axes of the first and second photographing modules from the first and second photographing modules, a storage unit configured to store positional information about the attachment regions, and a calculation unit configured to calculate a base length by obtaining the coordinate information about the optical axes and the positional information about the attachment regions in a case where one of a state of the first and second photographing modules and a state of the body of the electronic apparatus changes.

Accordingly, a second aspect of the present invention provides an image pickup apparatus that functions as a photographing module attached to any of attachment regions of a body of an electronic apparatus, the image pickup apparatus including a photographing lens, an image sensor configured to obtain image data by converting an object image formed with the photographing lens photoelectrically, and a memory configured to store coordinate information about an optical axis of the photographing lens based on a contour of the photographing module.

Accordingly, a third aspect of the present invention provides a control method for an electronic apparatus in which first and second photographing modules are attached to any two of attachment regions, the control method including a step of photographing in a compound eye mode, a step of obtaining two pieces of coordinate information about optical axes of the first and second photographing modules from the first and second photographing modules, a step of storing positional information about the attachment regions, and a step of calculating a base length by obtaining the coordinate information about the optical axes and the positional information about the attachment regions in a case where one of a state of the first and second photographing modules and a state of a body of the electronic apparatus changes.

Accordingly, a fourth aspect of the present invention provides a non-transitory computer-readable storage medium storing a control program causing a computer to execute the control method of the third aspect.

According to the present invention, a correct base length is obtained even if at least one of a plurality of photographing modules is attached to any slot different from an original slot at any timing.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

FIG. 1A through FIG. 1D are external views a of a smart device 50 as an electronic apparatus according to a first embodiment of the present invention.

Figure 1A:
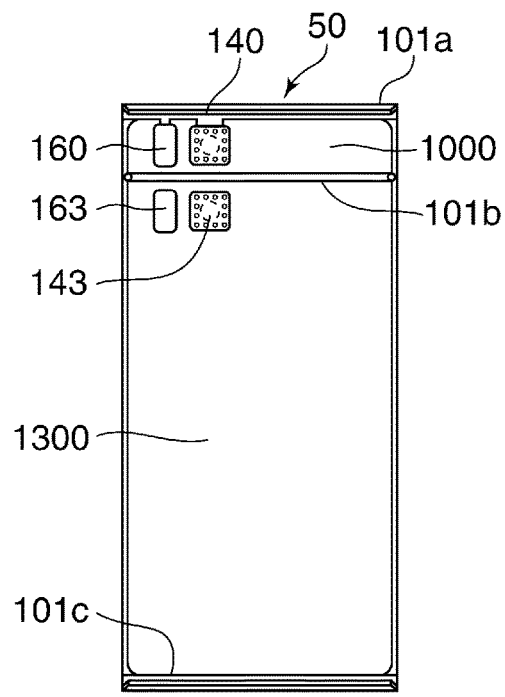
FIG. 1A through FIG. 1D are external views showing a body of a smart device as an electronic apparatus according to a first embodiment of the present invention.
Figure 1B:
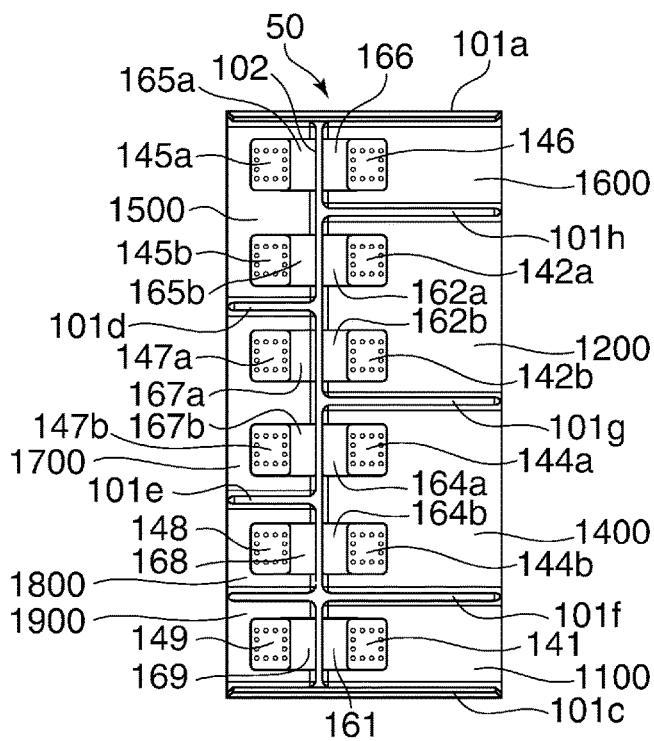

FIG. 1A is an external view of a body of the smart device 50 viewed from a front side, and FIG. 1B is an external view of the body viewed from a back side.

As shown in FIG. 1A, a plurality of ribs 101a, 101b, and 101c are formed on the front side of the body of the smart device 50. Moreover, as shown in FIG. 1B, a plurality of ribs and a spine 102, which divides the body of the smart device 50 into right and left areas, are formed on the back side of the body of the smart device 50 in addition to the ribs 101a and 101c that are common with the front side. The ribs 101a through 101h and the spine 102 (guide parts) have a guiding function for a module to be attached and a holding function for an attached module, and have a function to improve rigidity of the body of the smart device 50. Hereinafter, the ribs 101a through 101h and the spine 102 are collectively referred to as a frame structure. The front side and back side of the body of the smart device 50 are divided by the frame structure into slots 1000, 1100, 1200, 1300, 1400, 1500, 1600, 1700, 1800, and 1900 as attachment regions for a plurality of modules.

Electro permanent magnets (EPMs) 160 and 163, which manage an electromagnetism attachment-and-detachment mechanism, are arranged near the left ends in the drawing in the front-side slots 1000 and 1300 of the body of the smart device 50 as shown in FIG. 1A, Body side non-contact communication systems (hereinafter referred to as body-side CMCs) 140 and 143, which enable data communication between the body of the smart device 50 and each module, are respectively arranged at the right sides of the EPMs 160 and 163. As shown in FIG. 1B, EPMs 165a, 165b, 167a, 167b, 168, and 169 are provided in the slots 1500, 1700, 1800, and 1900 on the left side of the spine 102 of the back side of the body of the smart device 50. And body-side CMCs 145a, 145b, 147a, 147b, 148, and 149 are respectively arranged at the left sides of the EPMs. Moreover, EPMs 161, 162a, 162b, 164a, 164b, and 166 are provided in the slots 1100, 1200, 1400, and 1600 on the right side of the spine 102. And body-side CMCs 141, 142a, 142b, 144a, 144b, and 146 are respectively arranged at the right sides of the EMSs.

Figure 1C:
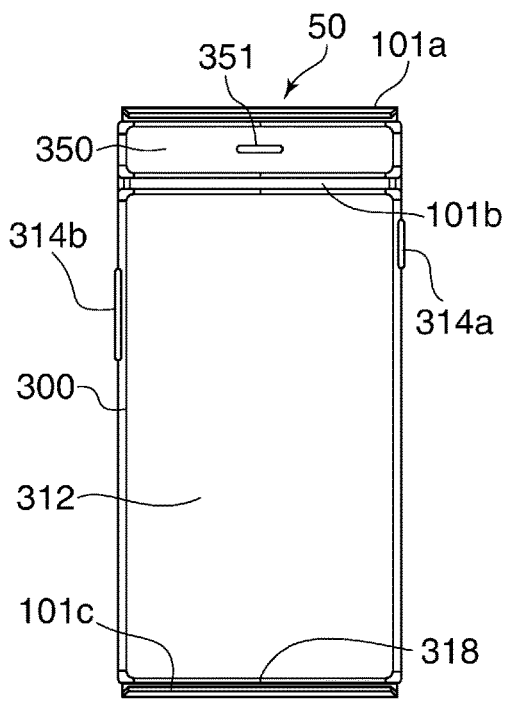
Figure 1D:
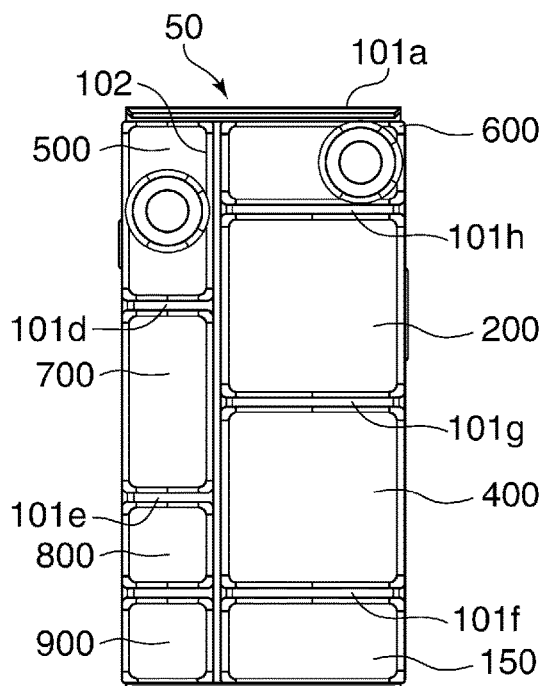

FIG. 1C is an external view showing a state where the modules are attached to the body of the smart device 50 viewed from the front side, and FIG. 1D is an external view showing the state viewed from the back side.

As shown in FIG. 1C and FIG. 1D, a display operation module 300 that consists of an LCD panel 312 having a touch detection function within an approximately whole surface is attached to the slot 1300 in a lower part of the front side of the body of the smart device 50. A power button 314a for switching ON and OFF of power of the smart device 50 is provided in the right side of the display operation module 300. And, a volume control button 314b for adjusting volume is provided in the left side of the display operation module 300. Furthermore, a microphone 318 that detects a call person's voice in a case where the smart device 50 functions as a mobile wireless communication device is provided in the display operation module 300. The microphone 318 also plays a role to collect sounds of a video image when the smart device 50 functions as a video camera. Moreover, a speaker module 350 is attached to the slot 1000 in an upper part of the front side of the body of the smart device 50. The speaker module 350 is equipped with a loudspeaker 351 that outputs received voice in a case where the smart device 50 functions as a mobile wireless communication device. In addition, the loudspeaker 351 outputs music and operation sound.

In the meantime, a photographing module 500 that has various photographing functions is attached to the slot 1500 in the upper part on the left side of the spine 102 of the back side of the body of the smart device 50. Moreover, a photographing module 600 is attached to the slot 1600 in the upper part on the right side of the spine 102. In a case where the slots to which the photographing modules 500 and 600 are attached are in an approximately same plane and the optical axes of the photographing modules 500 and 600 are approximately parallel, a compound eye mode mentioned later is set as a mode that a user is able to select. This enables the photographing modules 500 and 600 to frame the same object in each photographing target area, which enables measurement of an object distance using parallax mentioned later and approximately simultaneous photographing. Moreover, although the photographing modules 500 and 600 have a common configuration so that an attachment-detachment means and a communication means to the body of the smart device 50 satisfy standard specifications as mentioned above, the modules are different in an arrangement of components.

A wireless LAN module 700 that enables wireless data communication with an external apparatus is attached to the slot 1700 formed below the slot 1500. Furthermore, a posture detection module 800 that detects posture of the smart device 50 is attached to the slot 1800 below the slot 1700. The posture detection module 800 detects the posture of the smart device 50 using angular velocity information obtained from a triaxial gyro sensor. A mobile communication module 900 that has a single or a plurality of various remote distance communication functions, such as TDMA, CDMA, and LTE, is attached to the slot 1900 in the bottom part on the left side of the spine 102.

An application program control module 200 that controls the entire smart device 50 is attached to the slot 1200 formed below the slot 1600. When installing an exclusive application program for a predetermined attached module in the application program control module 200, a user is able to use a desired function of the smart device 50 through the application program control module 200. For example, when a telephone call application that is exclusive for the mobile communication module 900 is installed, a call function becomes available by operating the mobile communication module 900 through the application program control module 200. Moreover, when an Internet-access application that is exclusive for the wireless LAN module 700 is installed, a web browsing function by the Internet access becomes available by operating the wireless LAN module 700 through the application program control module 200. Moreover, when a photographing application that is exclusive for the photographing modules 500 and 600 is installed, functions of a compound eye camera, such as image composite functions and measurement functions, become available by operating the photographing modules 500 and 600 through the application program control module 200.

The image composite functions of the compound eye camera include a three-dimensional view mode, panorama mode, pan-focus mode, dynamic range expansion mode, Charlot focus mode, and multi-zoom (high resolution) mode that are described in JP4448844B mentioned above. Then, the exclusive photographing application is arbitrarily set up by each of the photographing modules 500 and 600. Each of these image composite functions generates data of one image by compositing data of two images by photographing simultaneously while matching or differentiating photographing conditions of the respective photographing modules 500 and 600.

Moreover, the distance measurement technique described in JP3792832B mentioned above is applied to the above-mentioned photographing application as the measurement function. The function processes a stereo image obtained by photographing an object with the photographing modules 500 and 600 simultaneously to recognize the object three-dimensionally or to measure a distance to the object. In addition, the concrete operation that achieves the function of such a compound eye camera will be mentioned later according to FIG. 11 and FIG. 12.

A power supply module 40 that supplies the power to the smart device 50 is attached to the slot 1400 below the slot 1200. Furthermore, a recording module 150 that saves various data, such as photographed image data, is attached to the slot 1100 in the bottom part on the right side of the spine 102.

Figure 2A:
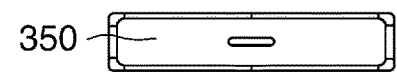
FIG. 2A through FIG. 2D are external views showing modules attached to the body of the smart device of the first embodiment.
Figure 2A:
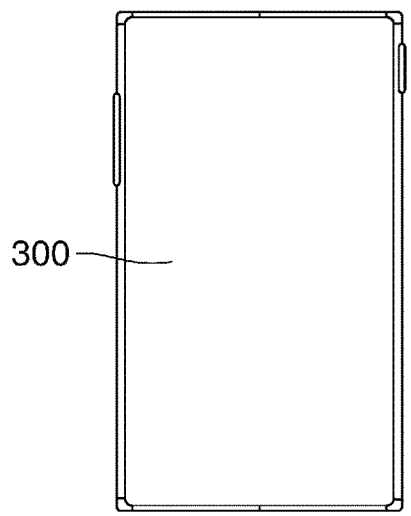
Figure 2B:
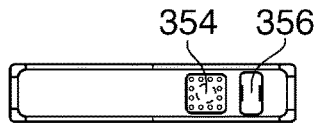
Figure 2B:
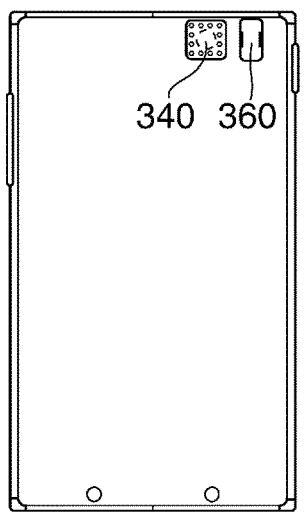
Figure 2C:
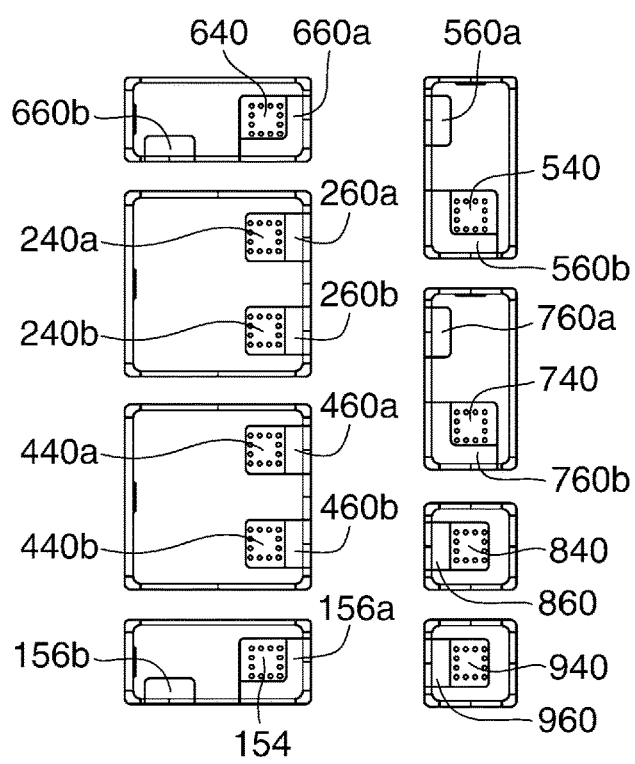
Figure 2D:
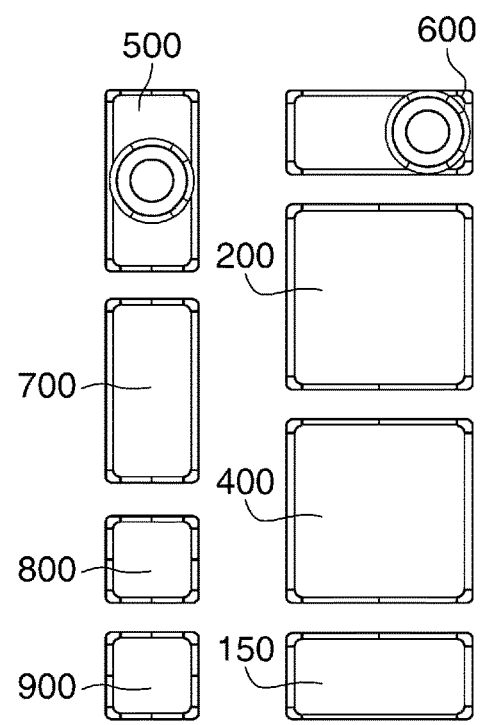

FIG. 2A is an external view showing the display operation module 300 and the speaker module 350 that are attached to the front side of the body of the smart device 50 viewed from the front side. FIG. 2B is an external view showing these modules viewed from the back side. FIG. 2C is an external view showing the photographing modules 500 and 600, the wireless LAN module 700, the posture detection module 800, the mobile communication module 900, the application program control module 200, the power supply module 400, and the recording module 150 that are attached to the back side of the body of the smart device 50 viewed from the front side. FIG. 2D is an external view showing these modules viewed from the back side, As shown in FIG. 2B, magnetic bodies 360 and 356 are provided on back sides of the display operation module 300 and the speaker module 350 at positions that face the EPMs 163 and 160 provided in the body of the smart device 50. The magnetic bodies 360 and 356 used is preferably made from soft magnetic material that has large magnetic permeability and small coercive force, and HIPERCOTM50 that is soft magnetism alloy of iron and cobalt vanadium is employed in this embodiment. The same material is employed also in each magnetic body described hereinafter.

Furthermore, module-side non-contact communication systems (hereinafter referred to as module-side CMCs) 340 and 354 are provided at positions that face the body-side CMCs 143 and 140 provided in the body of the smart device 50. A module-side CMC performs high-speed contact proximity communication with a proximate body-side CMC by an inductive coupling method. Thereby, each module exchanges data and messages with the body of the smart device 50. The magnetic body 360 and the module-side CMCs 340 are adjacently provided in the display operation module 300. The magnetic body 356 and the module-side CMC 354 are adjacently provided in the speaker module 350.

In the meantime, as shown in FIG. 2C, magnetic bodies 560a and 560b are provided on a back side of the photographing module 500 at positions that face the EPMs 165a and 165b provided in the body of the smart device 50. Moreover, a magnetic body 660a is provided on a back side of the photographing module 600 at a position that faces the EPM 166 provided in the body of the smart device 50. In addition, although a magnetic body 660b is also provided in the back side of the photographing module 600, the body of the smart device 50 provides no EPM that faces the magnetic body 660b. Accordingly, the photographing module 600 does not use the magnetic body 660b, but is attached to the body of the smart device 50 because the magnetic body 660a joins to the EPM 166 by magnetic force.

Similarly, magnetic bodies 760a and 760b are provided on a back side of the wireless LAN module 700 at positions that face the EPMs 167a and 167b provided in the body of the smart device 50. Moreover, magnetic bodies 860 and 960 are provided on back sides of the posture detection module 800 and the mobile communication module 900 at positions that face the EPMs 168 and 169 provided in the body of the smart device 50.

Similarly, magnetic bodies 760a and 760b are provided on a back side of the wireless LAN module 700 at positions that face the EPMs 167a and 167b provided in the body of the smart device 50. Moreover, magnetic bodies 460a, 460b, and 156a are provided on back sides of the power supply module 400 and the recording module 150 at positions that face the EPMs 164a, 164b, and 161 provided in the body of the smart device 50. In addition, although a magnetic body 156b is also provided in the back side of the recording module 150, the body of the smart device 50 provides no EPM that faces the magnetic body 156b. Accordingly, the recording module 150 does not use the magnetic body 156b, but is attached to the body of the smart device 50 because the magnetic body 156a joins to the EPM 161 by magnetic force.

Module-side CMCs 540, 640, 740, 840, 940, 240a, 240b, 440a, 440b, and 154 are provided at positions that face the body-side CMCs 145b, 146, 147b, 148, 149, 142a, 142b, 144a, 144b, and 141. The modules exchange data with the body of the smart device 50 through these module-side CMCs. The magnetic bodies 560b, 660a, 760b, 860, 960, 260a, 260b, 460a, 460b, and 156a and the module-side CMCs 540, 640, 740, 840, 940, 240a, 240b, 440a, 440b, and 154 are adjacently arranged, respectively. Then, each of the photographing modules 500 and 600, the wireless LAN module 700, the posture detection module 800, the mobile communication module 900, and the recording module 150 is provided with at least a pair of magnetic body and module-side CMC. Moreover, each of the application program control module 200 and the power supply module 400 is provided with two pairs of magnetic bodies and module-side CMCs.

Figure 3A:
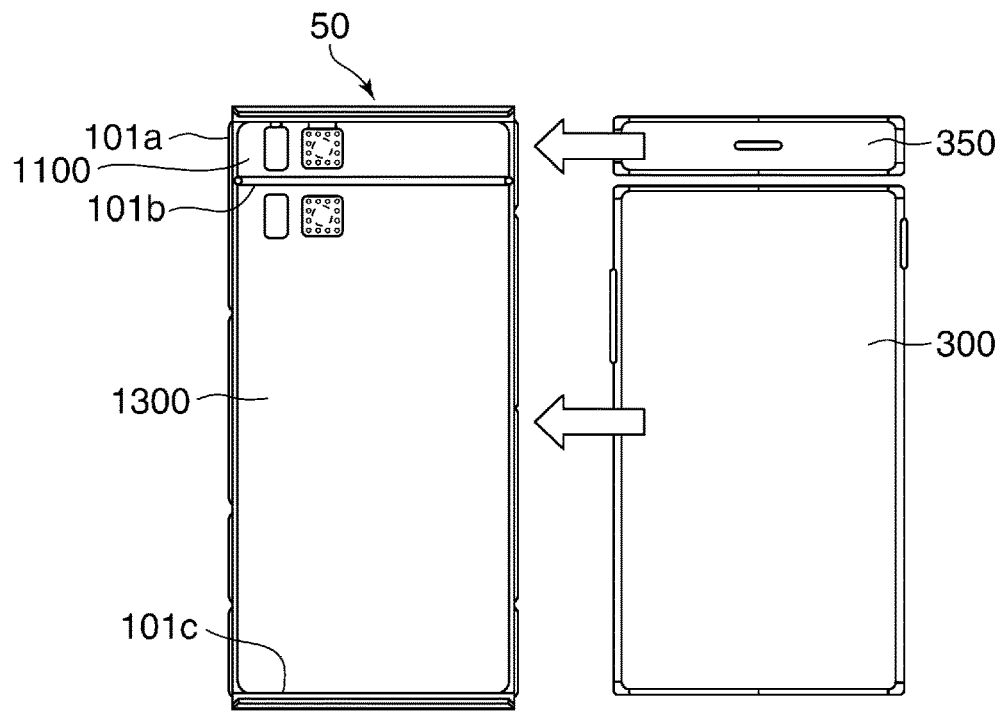
FIG. 3A and FIG. 3B are explanation views showing how to attach the modules to the body of the smart device of the first embodiment.
Figure 3B:
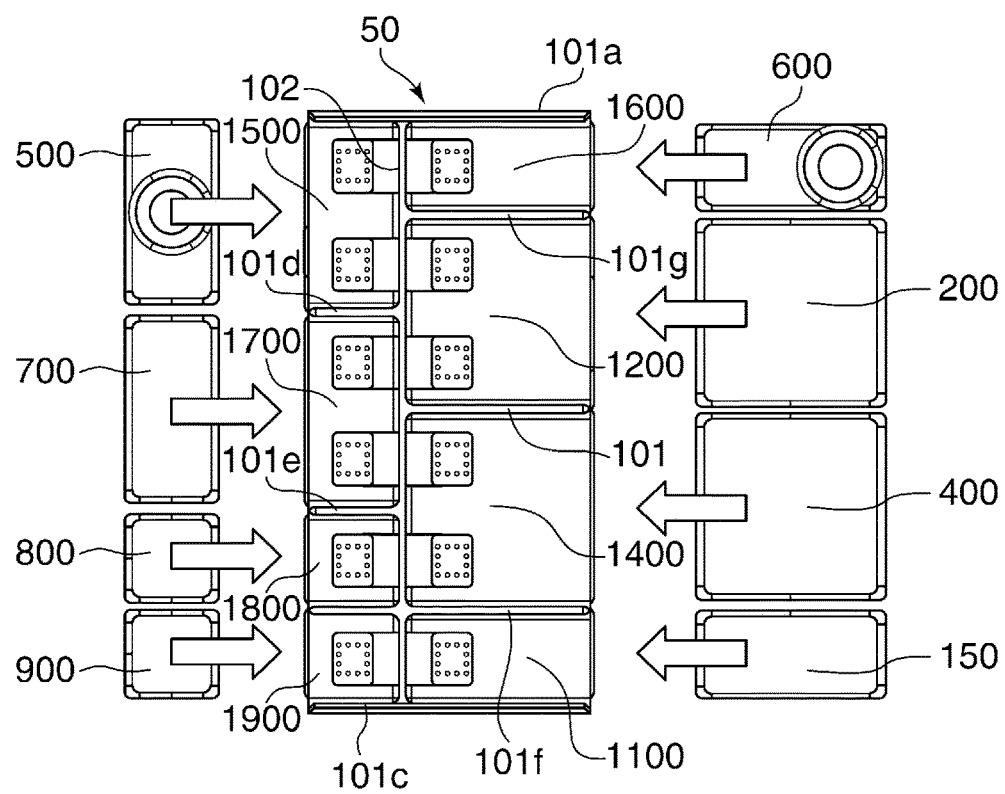

FIG. 3A and FIG. 3B are explanation views showing how to attach the modules 150, 200, 300, 350, 400, 500, 600, 700, 800, and 900 to the body of the smart device 50.

As shown in FIG. 3A, the display operation module 300 and the speaker module 350 are attached to the front side of the body of the smart device 50 by sliding from the lateral side along the ribs 101a through 101c. At this time, the display operation module 300 and the speaker module 350 can be inserted from either the left side or the right side of the body of the smart device 50.

As shown in FIG. 3B, the photographing module 500, the wireless LAN module 700, the posture detection module 800, and the mobile communication module 900 are attached to the body of the smart device 50 by sliding from the left side. The positions of the modules 500, 700, 800, and 900 to the body of the smart device 50 are determined by butting the modules against the spine 102 from the left side. Moreover, the photographing module 600, the application program control module 200, the power supply module 400, and the recording module 150 are attached to the body of the smart device 50 by sliding from the right side. The positions of the modules 600, 200, 400, and 150 to the body of the smart device 50 are determined by butting the modules against the spine 102 from the right side.

In the first embodiment, the slots provided in the back side of the body of the smart device 50 are classified into first, second, and third groups by size as shown in FIG. 3B. First, the slots 1500, 1600, 1700, and 1100 are classified into the first group. For example, the photographing module 500 may be attached to any slot among these four slots. In addition, although there are four slots to which the photographing module 500 can be attached in this embodiment, the present invention is not limited to such a configuration as long as there are three or more slots. Moreover, the largest slots 1200 and 1400 are classified into the second group. For example, the application program control module 200 may be attached to either of these two slots. The smallest slots 1800 and 1900 are classified into the third group. For example, the posture detection module 800 may be attached to either of these two slots.

Figure 4A:
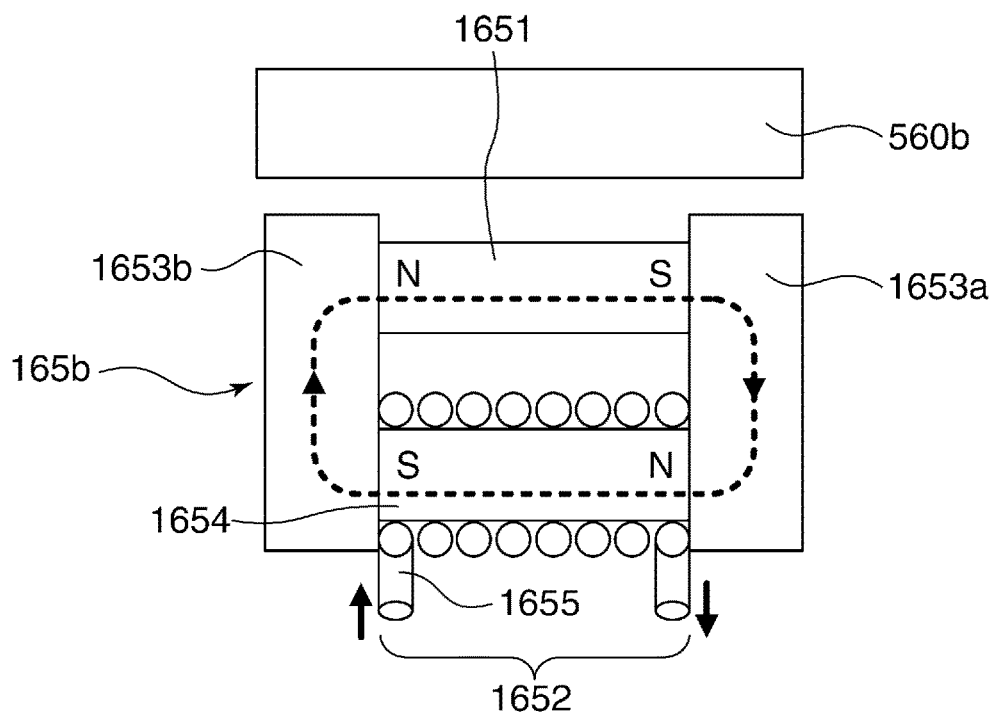
FIG. 4A and FIG. 4B are explanation views showing magnetic coupling between an EPM of the body of the smart device of the first embodiment and a magnetic body of a module.
Figure 4B:
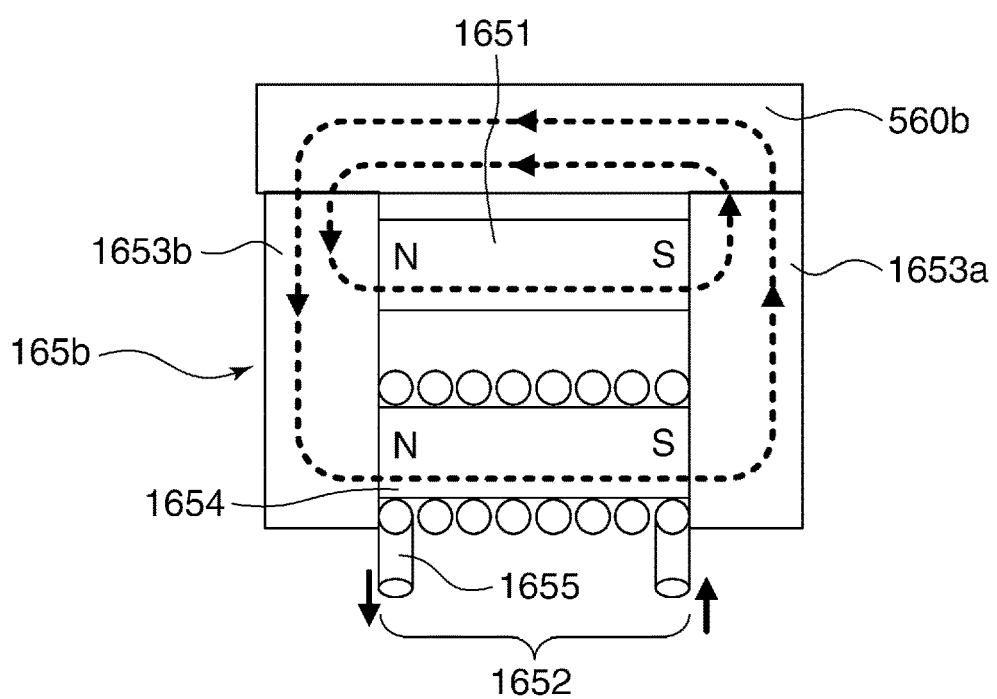

FIG. 4A and FIG. 4B are explanation views showing magnetic coupling between the EPM 165b of the body of the smart device 50 and the magnetic body 560b of the photographing module 500.

FIG. 4A is a partial enlarged view in a state where the body of the smart device 50 is not coupled with the photographing module 500 by magnetic force. Moreover, FIG. 4B is a partial enlarged view in a state where the body of the smart device 50 is coupled with the photographing module 500 by magnetic force. In addition, although FIG. 4A and FIG. 4B show the combination of the EPM 165b and the magnetic body 560b as an example, the same configuration as FIG. 4A and FIG. 4B is also applied to another combination of an EPM and a magnetic body.

As shown in FIG. 4A, the EPM 165b is configured so that both sides of a permanent magnet 1651 with fixed polarity and a permanent electromagnet 1652 are connected and held by magnetic bodies 1653a and 1653b. A neodymium magnet of which magnetic flux density is extremely high is suitable to the permanent magnet 1651. Moreover, the permanent electromagnet 1652 consists of a reversible permanent magnet 1654 made from hard magnetic material, such as alnico, and a coil 1655 wound around the reversible permanent magnet 1654. When an electric current is applied to the coil 1655, the reversible permanent magnet 1654 is magnetized in one direction, and holds a magnetization state as-is even after stopping the electric current. Energizing time to the coil 1655 is about one through several seconds. Thus, the polarity of the permanent electromagnet 1652 varies in response to change of the direction of the electric current applied to the coil 1655 (a polar change unit).

When the electric current is applied to the coil 1655 in the direction shown in FIG. 4A, the reversible permanent magnet 1654 is magnetized so that the permanent electromagnet 1652 generates the magnetic lines of force in the direction opposite to the direction of the magnetic lines of force of the permanent magnet 1651 of which polarity is fixed. As a result, the magnetic lines of force of the permanent electromagnet 1652 and the magnetic lines of force of the permanent magnet 1651 form a closed loop, which extremely weakens the magnetic force that attracts the magnetic body 560b of the photographing module 500. Accordingly, the photographing module 500 is released without receiving magnetic attraction from the EPM 165b.

In the meantime, when the electric current is applied to the coil 1655 in the inverse direction as shown in FIG. 4B, the reversible permanent magnet 1654 is magnetized so that the permanent electromagnet 1652 generates the magnetic lines of force in the direction identical to the direction of the magnetic lines of force of the permanent magnet 1651 of which polarity is fixed. As a result, the magnetic lines of force of the permanent electromagnet 1652 and the magnetic lines of force of the permanent magnet 1651 are mutually intensified, which extremely increases the magnetic force that attracts the magnetic body 560b of the photographing module 500. Accordingly, the photographing module 500 is fixed to the body of the smart device 50 by the magnetic attraction from the EPM 165b. Since the EPMs are employed as the attachment-detachment means in the first embodiment, both operability and reliability of the modules are established.

Figure 5:
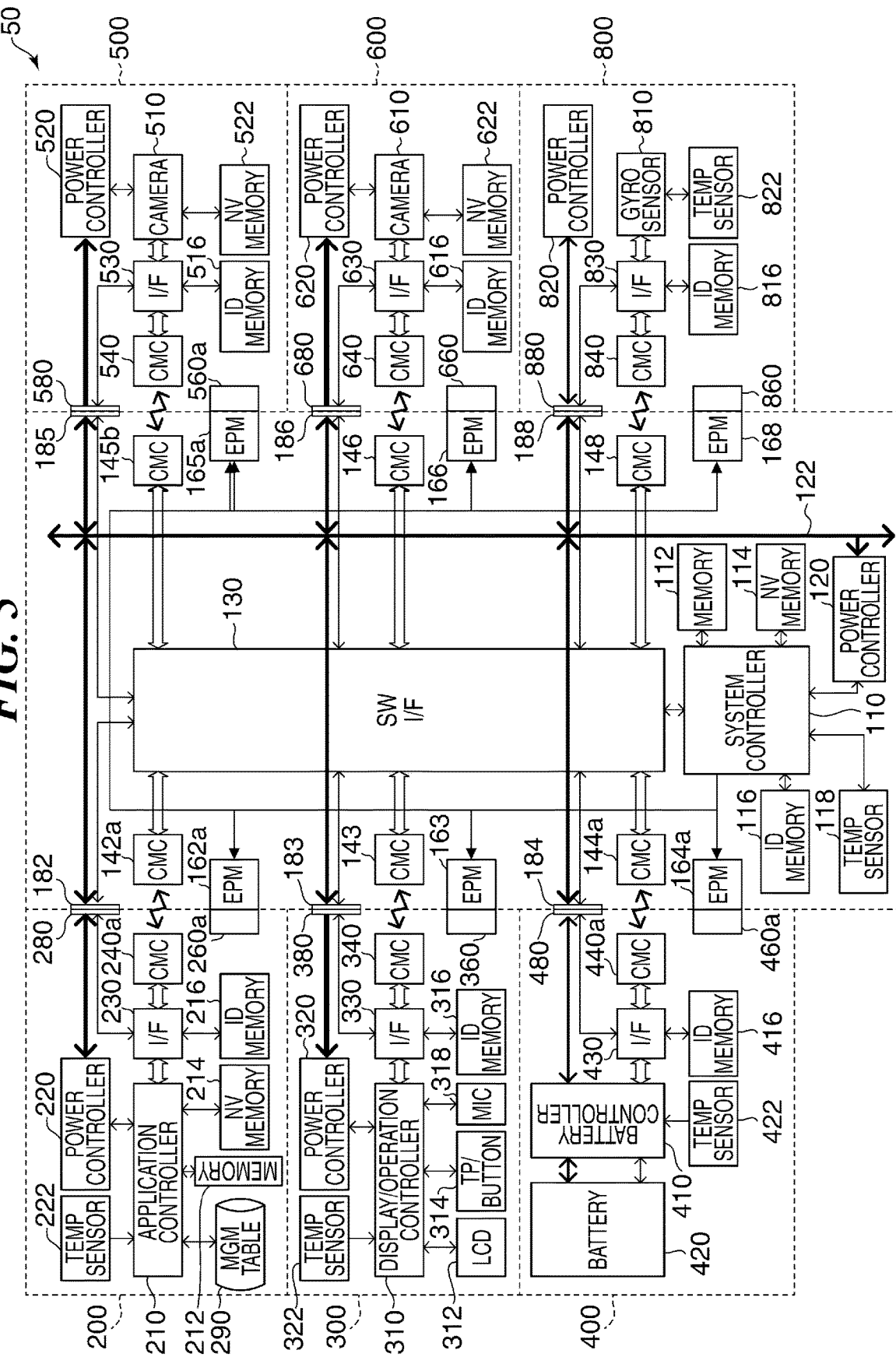
FIG. 5 is a block diagram schematically showing hardware configurations of the plurality of modules and the body of the smart device of the first embodiment equipped with the modules.

FIG. 5 is a block diagram schematically showing hardware configurations of the plurality of modules 200 through 600, and 800 and of the body of the smart device 50 equipped with the modules.

Hereinafter, the configuration of the body of the smart device 50, the configurations of the application program control module 200, display operation module 300, power supply module 400, photographing modules 500 and 600, and posture detection module 800 will be described with reference to FIG. 5. In addition, various types of modules are attachable to the body of the smart device 50. The combination shown in FIG. 5 is one example, and the present invention is not limited to the combination.

The body of the smart device 50 controls each module attached to the body of the smart device 50 under the total control by the application program control module 200. When running various application programs in the environment where a kernel and an OS are running, a system control circuit (system controller) 110, which controls the entire body of the smart device 50, operates coordinately in response to an instruction and a request from an application control circuit (application controller) 210 of the application program control module 200. Then, the system control circuit 110 enables a cooperating operation of the body of the smart device 50 and each module, and is available to perform various services and functions through the application control circuit 210.

The system control circuit 110 directly accesses to a memory 112 to read and write data. An electrically erasable programmable nonvolatile memory (NV memory) 114 stores constants, variables, and programs for operations of the system control circuit 110, and stores positional information about each slot. For example, a flash memory is used as the NV memory 114. The positional information includes positional information about each of the slots 1100, 1200, 1400, 1500, 1600, 1700, 1800, and 1900 provided in the back side of the body of the smart device 50. The positional information about the slots specifies the coordinates of the butting surfaces of the ribs 101a, 101c through 101h and the spine 102 that determine the positions of the attached modules. Although the modules are positioned by butting against the ribs 101a, 101c through 101h and the spine 102 in the first embodiment, the present invention is not limited to this. For example, a convex part may be provided in the body of the smart device 50, and a concave part that fits to the convex part may be provided in each module. In this case, the positional information about each slot includes positional information about the convex part for positioning.

An identification information memory (ID memory) 116 stores variety of identification information required when the body of the smart device 50 communicates with each module. A temperature sensor (TEMP sensor) 118 measures a temperature of a predetermined spot of the body of the smart device 50. A power control circuit (power controller) 120 supplies electric current of a predetermined voltage required to each part of the body of the smart device 50 through the system control circuit 110.

A power supply bus 122 is connected to the power control circuit 120 of the body of the smart device 50 and power supply terminals of connectors 182 through 186 and 188. The power supply terminals of the connectors 182 through 186 and 188 are connected to power control circuits 220, 320, 410, 520, 620, and 820 of the modules through power supply terminals of connectors 280, 380, 480, 580, 680, and 880 of the modules, respectively.

A switch interface circuit (SW I/F) 130 connects to the modules through the body-side CMCs 142a, 143, 144a, 145b, 146, and 148 and the module-side CMCs 240a, 340, 440a, 540, 640, and 840 so as to switch and to relay high-speed communication of data and messages between the modules and the body of the smart device 50. In addition, the combination of the body-side CMCs and the module-side CMCs shown in FIG. 5 is one example and may be changed suitably according to a user's intention.

The smart device 50 switches an attracting state and a non-attracting state by controlling magnetic force of the EPMs 162a, 163, 164a, 165a, 166, and 168. Accordingly, each module is locked or released in an attachment position of the frame structure of the body of the smart device 50 and the module. In addition, the combination of the EPMs of the body of the smart device 50 and the magnetic bodies of the modules connected thereto shown in FIG. 5 is one example and may be changed suitably according to a user's intention.

The connectors 182 through 186 and 188 respectively connect to the connectors 280, 380, 480, 580, 680, and 880 of the modules. Accordingly, the terminal group related to the power source (power bus and ground) becomes available between the body of the smart device 50 and the modules mutually. Furthermore, functions of terminals, such as a terminal of a Detect signal indicating attachment of a module, a terminal of a Wake signal that means a release of sleep of a module, and a terminal of an RF signal connecting a wiring of an antenna, become available mutually in the same manner. Although the connectors 182 through 186 and 188 in the first embodiment are general compact metal terminals formed in the ribs 101*a* through 101*h* or the spine 102 of the body of the smart device 50, they are not shown in FIG. 1A, FIG. 1B, FIG. 3A, and FIG. 3B because they cannot be seen in these figures. In addition, the combination of the connecters 182 throughs 186 and 188 and the module-side connecters connected thereto shown in FIG. 5 is one example and may be changed according to a user's intention.

The application program control module 200 totally controls the entire system including the body of the smart device 50 and the modules attached thereto with the operation of the application control circuit 210. For example, the application control circuit 210 controls the LCD panel 312, which is a display unit, through a display operation control circuit 310 of the display operation module 300 to display variety of information. Moreover, the application control circuit 210 obtains information about an input operation to a touch panel and operation buttons (hereinafter referred to as "TP/button") 314, which constitute an operation input means, through the display operation control circuit 310 of the display operation module 300. Then, it is available to perform a service of a kernel, a service of an OS, and processes by various application programs according to the contents of the input operation.

The application control circuit 210 directly accesses to a memory 212 to read and write data. A nonvolatile memory 214 stores constants, variables, and programs for operations of the application control circuit 210. An identification information memory 216 stores variety of identification information required when the application program control module 200 communicates with the body of the smart device 50 and the other modules. The power control circuit 220 supplies electric current of a predetermined voltage required to each part of the application program control module 200. A temperature sensor 222 measures a temperature of a predetermined spot of the application program control module 200. An interface circuit 230 relays high-speed communication of data and messages with the body of the smart device 50 and the other modules through the module-side CMC 240*a*.

A management table (MGM table) 290 stores information about a plurality of management files required for running exclusive application programs. The information about the management files includes types of indispensable modules for running each exclusive application program, a combination of the applicable modules that utilizes a desired function at the maximum, and an optimal positional relationship between the slots to which the modules are attached. Moreover, the information about the management files includes types of modules that are not indispensable for each exclusive application program but are effective to add functions in the first embodiment, which improves convenience by providing a user with many choices. The application control circuit 210 obtains such information about the management files from the management table 290. It should be noted that the present invention is not limited to this configuration. The memory 212 or the nonvolatile memory 214 may store the information about the management files. In such a case, the application control circuit 210 obtains the information about the management files from the memory 212 or the nonvolatile memory 214.

The display operation module 300 displays variety of information and obtains an input operation by controlling the body of the smart device 50 under the total control by the application program control module 200. The display operation control circuit (display operation controller) 310 controls the entire display operation module 300. Although the display operation module 300 may employ a display device, such as LCD, OLED, or LED, as the display unit, the LCD panel 312 is employed in the first embodiment. Operation devices, such as a touch panel (TP) and operation buttons, may be constituted independently or integrally as the operation input means of the display operation module 300. The first embodiment employs the TP/button 314 constituted independently.

The display operation control circuit 310 displays variety of information to a user on the LCD panel 312 in response to instructions from the application control circuit 210 of the application program control module 200. Moreover, input operations, such as a touch-panel operation and a button operation, by the user to the TP/button 314 and a voice signal detected by the microphone 318 are transferred to the application control circuit 210 through the display operation control circuit 310.

An identification information memory 316 stores various identification information required when the display operation module 300 communicates with the body of the smart device 50 and the other modules. The power control circuit 320 supplies electric current of a predetermined voltage required to each part of the display operation module 300. A temperature sensor 322 measures a temperature of a predetermined spot of the display operation module 300. An interface circuit 330 relays high-speed communication of data and messages with the body of the smart device 50 and the other modules through the module-side CMC 340.

The power supply module 400 supplies electric power to each module from a battery 420 through the power supply bus 122 of the body of the smart device 50 under the total control by the application program control module 200. A battery control circuit (battery controller) 410 in the power supply module 400 controls the entire power supply module 400 including supply-and-charge control of the battery 420, and supplies electric current of a predetermined voltage required to each part of the power supply module 400. An identification information memory 416 stores variety of identification information required when the power supply module 400 communicates with the body of the smart device 50 and the other modules.

The battery 420, such as a Li-ion battery or a fuel cell, supplies electric current to the body of the smart device 50 and the modules and is charged from the body of the smart device 50 and a charging module (not shown) through the connector 480 by the battery control circuit 410. A temperature sensor 422 measures a temperature of a predetermined spot of the power supply module 400. An interface circuit 430 relays high-speed communication of data and messages with the body of the smart device 50 and the other modules through the module-side CMC 440*a*.

The photographing module 500 is an image pickup apparatus that is controlled by the body of the smart device 50 and performs a desired image pickup process under the total control by the application program control module 200. The photographing module 500 is provided with a camera 510 that has a photographing lens including a plurality of optical lenses arranged on an optical axis. The camera 510 is provided with a diaphragm mechanism that adjusts a passing light amount to pass, an AF system that moves at least one optical lens (a focusing lens) in an optical axis direction for focusing, and a lens barrel that contains these components inside. Moreover, the camera 510 is provided with an image sensor that obtains image data by photoelectric conversion, an image processing circuit that processes the image data, and a drive control circuit that controls each mechanism.

The camera 510 achieves automatic exposure control (AE) that sets up an aperture value, a shutter speed, and a sensitivity of the image sensor optimally, automatic focusing (AF) corresponding to an object distance, and automatic white balance (AWB) that adjusts a color temperature so as to reproduce proper tone. In addition, the first embodiment is capable of performing simple image stabilization (IS) by making an exposure area that is cut out from the entire area of the image sensor follow camera shake that is calculated according to angular velocity information obtained by the posture detection module 800. In addition, the present invention does not limit a general control method of an image pickup apparatus. Since the method has been already known in prior art documents, the detailed individual description is omitted.

The camera 510 is instructed by the inputs through the TP/button 314 of the display operation module 300 and by the application program that runs in the application control circuit 210. The application control circuit 210 controls the body of the smart device 50 and the display operation module 300, so that the image data obtained with the camera 510 is displayed on the LCD panel 312.

An identification information memory 516 stores variety of identification information required when the photographing module 500 communicates with the body of the smart device 50 and the other modules. A power control circuit 520 supplies electric current of a predetermined voltage required to each component of the photographing module 500.

A nonvolatile memory 522 stores constants and variables for operations of the camera 510, positional information about the components, optical-axis error information, and lens error information. The positional information about the component includes coordinate information about the optical axis based on the contour of the photographing module 500. As mentioned above, although the photographing module 500 is positioned by butting to the ribs 101*a* through 101*h* and the spine 102 of the body of the smart device 50, the present invention is not limited to this configuration. For example, a convex part may be provided in the body of the smart device 50, and a concave part that fits to the convex part may be provided in the photographing module 500. In this case, the positional information about the component includes the coordinate information about the optical axis based on the concave part to which the convex part fits.

Moreover, the optical-axis error information includes inclination error of the optical axis of the camera 510 that occurs as a manufacture error due to lack of accuracy of parts or assembling. In the meantime, the lens error information includes a focal length error, an F-value error, distortion, and an angle error of the image sensor around the optical axis that occur as manufacture errors. Storing such information about the manufacture errors to the nonvolatile memory 522 enables the application control circuit 210 to correct these manufacture errors in the process thereof. This improves the accuracy of the image composite function or the measurement function when the functions of the compound eye camera are used.

An interface circuit 530 relays high-speed communication of data and messages with the body of the smart device 50 and the other modules through the module-side CMC 540.

The configuration of the photographing module 600 is the same as that of the photographing module 500, and is provided with a camera 610, a power control circuit 620, an interface circuit 630, an identification information memory 616, and a nonvolatile memory 622. However, the arrangement and shape of the camera 610 in the photographing module 600 differ from the arrangement and shape of the camera 510 in the photographing module 500.

The posture detection module 800 is controlled by the body of the smart device 50 so as to detect the posture of the smart device 50 under the total control by the application program control module 200. In the posture detection module 800, the triaxial gyro sensor 810 obtains angular velocity information. An identification information memory 816 stores variety of identification information required when the posture detection module 800 communicates with the body of the smart device 50 and the other modules. A power control circuit 820 supplies electric current of a predetermined voltage required to each part of the posture detection module 800. A temperature sensor 822 measures a temperature of a predetermined spot of the posture detection module 800.

An interface circuit 830 relays high-speed communication of data and messages with the body of the smart device 50 and the other modules through the module-side CMC 840. The interface circuit 830 sends the angular velocity information obtained with the gyro sensor 810 to the body of the smart device 50. Furthermore, the body of the smart device 50 transfers the data to the application program control module 200 at high speed. Thus, the angular velocity information from the posture detection module 800 is used for the switch of the display direction in the display operation module 300 and the image stabilization in the photographing modules 500 and 600.

Figure 6:
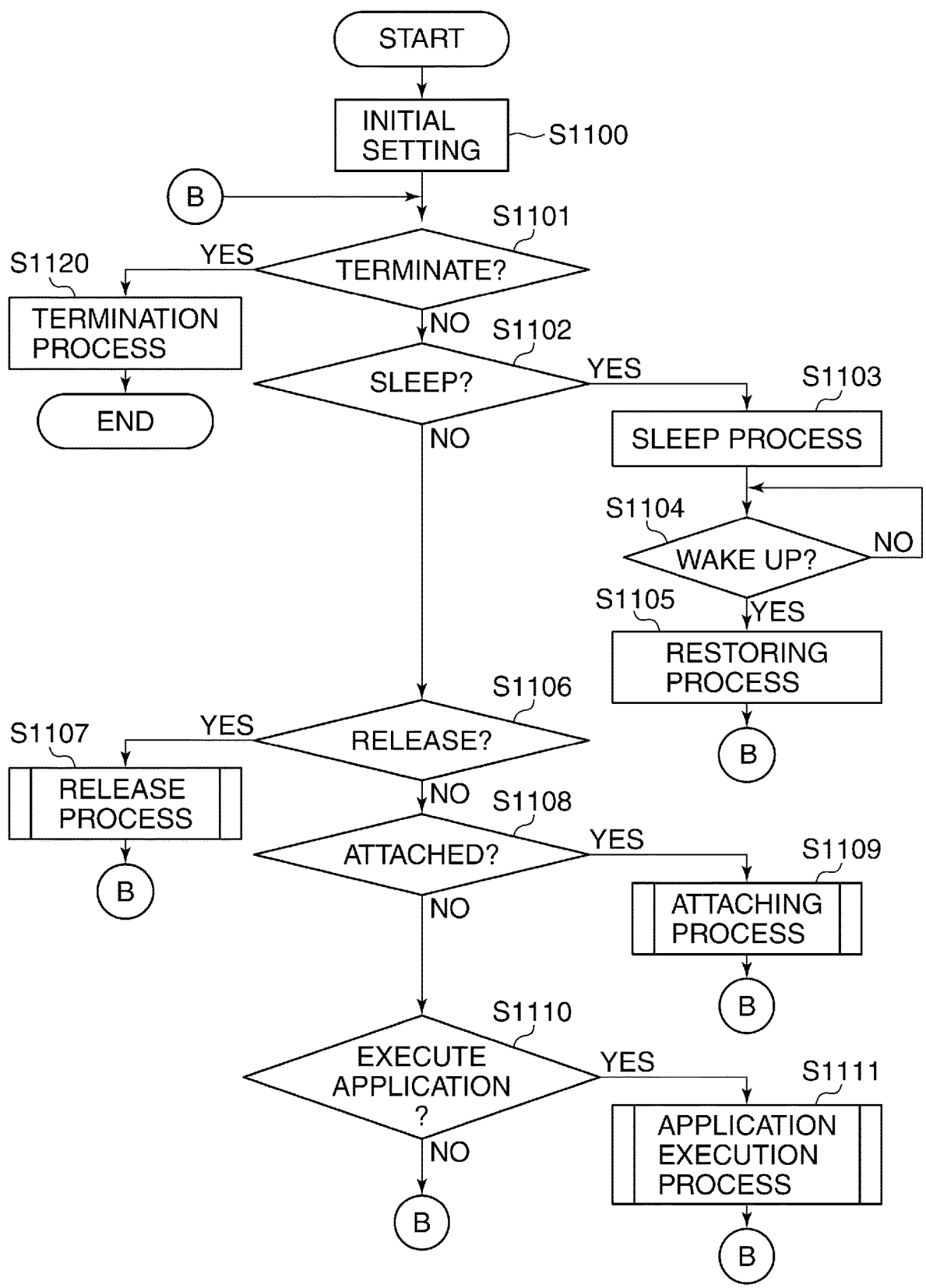
FIG. 6 is a flowchart showing procedures of a motion control process, which is executed by an application program control module, of the smart device of the first embodiment equipped with the plurality of modules.

Next, operations of the application program control module 200 will be described. FIG. 6 is a flowchart showing procedures of an operation control process, which is executed by the application program control module 200, of the smart device 50 equipped with the plurality of modules.

The process in FIG. 6 starts when a user operates the power button 314*a* of the display operation module 300 where the application program control module 200, the body of the smart device 50, and the display operation module 300 are in a low power consumption state.

In response to such a user's operation, the display operation control circuit 310 sends a Wake signal that means a release of sleep towards the application control circuit 210. When receiving the Wake signal from the display operation control circuit 310, the application control circuit 210 performs initial setting in step S1100. In the first embodiment, a terminal of a Detect signal is provided in a connector of every module that is attached to the body of the smart device 50. The Detect signal is used to detect that a module is newly attached to the body of the smart device 50. When a module that is newly attached to a free slot sends the Detect signal to the application control circuit 210 through the system control circuit 110, the process in FIG. 6 starts similarly.

In the step S1100, the application control circuit 210 initializes predetermined flags and control variables by resetting, and initializes each part of the application program control module 200. Next, the application control circuit 210 runs the software program read from the nonvolatile memory 214, and activates the kernel and OS in order. After that, the application control circuit 210 initializes the communication with the system control circuit 110 of the body of the smart device 50 through the interface circuit 230, module-side CMC 240a, body-side CMC 142a, and switch interface circuit 130. The initialization of the system control circuit 110 activates all the modules that are attached to the body of the smart device 50. Thereby, the display operation control circuit 310 of the display operation module 300 displays a predetermined starting screen on the LCD panel 312. Then, the display operation module 300 allows a user's input instruction to the TP/button 314.

After finishing the step S1100, the application control circuit 210 proceeds with the process to step S1101 and determines whether a termination message has been received. The display operation control circuit 310 sends the termination message to the application control circuit 210, when a user selects a termination button displayed on the LCD panel 312 using the TP/button 314.

When it is determined that the termination message has been received in the step S1101, the application control circuit 210 proceeds with the process to step S1120, and executes a termination process. Specifically, the application control circuit 210 saves the flags and control variables to the nonvolatile memory 214 if needed after sending the termination message to the system control circuit 110. Simultaneously, the system is shifted to an operation finish state where the OS and kernel operate with low power consumption. Then, the setting of power supply to the application program control module 200, the body of the smart device 50, and the display operation module 300 through the power control circuit 220 is changed to low power consumption. When receiving the termination message, the system control circuit 110 executes a process for stopping all the operations of the modules other than the application program control module 200, the body of the smart device 50, and the display operation module 300.

After finishing the termination process in the step S1120, the application control circuit 210 finishes this process, and results in the state of the power OFF.

When no termination message has been received in the step S1101, the application control circuit 210 proceeds with the process to step S1102, and determines whether a sleep message that shifts the system to a sleep state has been received from the display operation control circuit 310. The display operation control circuit 310 sends the sleep message to the application control circuit 210, when a user selects a sleep button displayed on the LCD panel 312 using the TP/button 314.

When it is determined that the sleep message has been received in the step S1102, the application control circuit 210 proceeds with the process to step S1103, and executes a sleep process. Specifically, the application control circuit 210 saves the flags and control variables to the nonvolatile memory 214 if needed after sending the sleep message to the system control circuit 110. Simultaneously, the system is shifted to a sleep operation state where the OS and kernel operate with low power consumption. When receiving the sleep message, the system control circuit 110 proceeds with the process to step S1104 after executing a process that shifts the operations of all the modules of the smart device 50 to the sleep state.

In addition, when the initial setting is performed in the step S1100, a release button and application execution button are displayed on the LCD panel 312 of the display operation module 300 in addition to the termination button and sleep button mentioned above. There are cases where a user does not select any button until a predetermined period elapses after these buttons are displayed on the LCD panel 312. Moreover, the Wake signal sent from the display operation control circuit 310 may not be received even if a predetermined period elapses after the user's operation to the power button 314a of the display operation module 300 at the start of this process. In such a case, the process proceeds to the step S1103 like the case where the sleep message has been received. Furthermore, the application control circuit 210 accumulates the elapsed period from the last timing when the input instruction by the process mentioned later or the Wake signal has been received in the step S1102. When the accumulated period is longer than a predetermined value, the system shifts to the sleep state. The sleep process after that has been mentioned above.

In the step S1104, the application control circuit 210 determines whether the Wake signal sent from any module has been received through the connector 280. When no Wake signal has been received in the step S1104, the sleep operation state is continued until the Wake signal is received. The sleep operation state in the first embodiment differs from the above-mentioned power OFF state. For example, when the mobile communication module 900 receives a call signal based on the mobile communication standard, the application control circuit 210 shifts the state of the smart device 50 to a predetermined application running state from the sleep operation state promptly. In addition, since the general control of such a movable radio communication system is well known, a detailed description is omitted.

When receiving the Wake signal in the step S1104, the application control circuit 210 proceeds with the process to step S1105, and executes a restoration process. Specifically, the application control circuit 210 restores the flags and control variables from the nonvolatile memory 214 if needed, and shifts the OS and kernel to a normal operation state in which they operate with normal power consumption. Moreover, the application control circuit 210 changes the setting of the power supply to all the modules of the smart device 50 through the power control circuit 220 to normal power consumption, and restores the communication with the system control circuit 110 of the body of the smart device 50. At this time, the system control circuit 110 executes the restoration process to all the modules other than the application control circuit 210, and shifts the smart device 50 to the normal operation state. After finishing the step S1105, the process returns to the step S1101.

When no sleep message has been received in the step S1102, the application control circuit 210 proceeds with the process to step S1106, and determines whether a release message that shifts the system to a release state has been received from the display operation control circuit 310. The display operation control circuit 310 sends the release message to the application control circuit 210, when a user selects a release button displayed on the LCD panel 312 using the TP/button 314 and when the user designates a module to be detached.

When it is determined that the release message has been received in the step S1106, the application control circuit 210 proceeds with the process to step S1107, and executes a release process. The release process is executed for a module to be detached in order to finish its function normally and to release the EPM thereof. Details of the release process will be described later with reference to FIG. 7. After finishing the step S1107, the process returns to the step S1101.

When no release message has been received in the step S1106, the application control circuit 210 proceeds with the process to step S1108, and determines whether the Detect signal of any module has been received.

When receiving the Detect signal in the step S1108, the application control circuit 210 proceeds with the process to step S1109, and executes an attaching process. The attaching process is executed in order that a module attached to the body of the smart device 50 is fixed and functions appropriately. Details of the attaching process will be described later with reference to FIG. 8. After finishing the step S1109, the process returns to the step S1101.

When it is determined that no Detect signal has been received in the step S1108, the application control circuit 210 proceeds with the process to step S1110, and determines whether an application-program relation message has been received from the display operation control circuit 310. The display operation control circuit 310 sends the application-program relation message to the application control circuit 210 when a user selects an application execution button displayed on the LCD panel 312 using the TP/button 314 and when the user designates an application program to run.

When it is determined that the application-program relation message has been received in the step S1110, the application control circuit 210 proceeds with the process to step S1111, and executes an application-program execution process. Application programs assumed in the first embodiment include various functions that are achievable with combinations of the modules. For example, a call function becomes available with the combination of the mobile communication module 900, the display operation module 300, and the speaker module 350, and the web browsing through the Internet access becomes available with the combination of the wireless LAN module 700 and the display operation module 300. Moreover, the general photographing functions are achieved by only the photographing module 500, and functions of a compound eye camera are achieved by the combination of the photographing modules 500 and 600. The details of a photographing-application execution process as an example of such application programs will be mentioned later with reference to FIG. 9. After finishing the step S1111, the process returns to the step S1101.

When it is determined that no application-program relation message has been received in the step S1110, the process returns to the step S1101.

Figure 7:
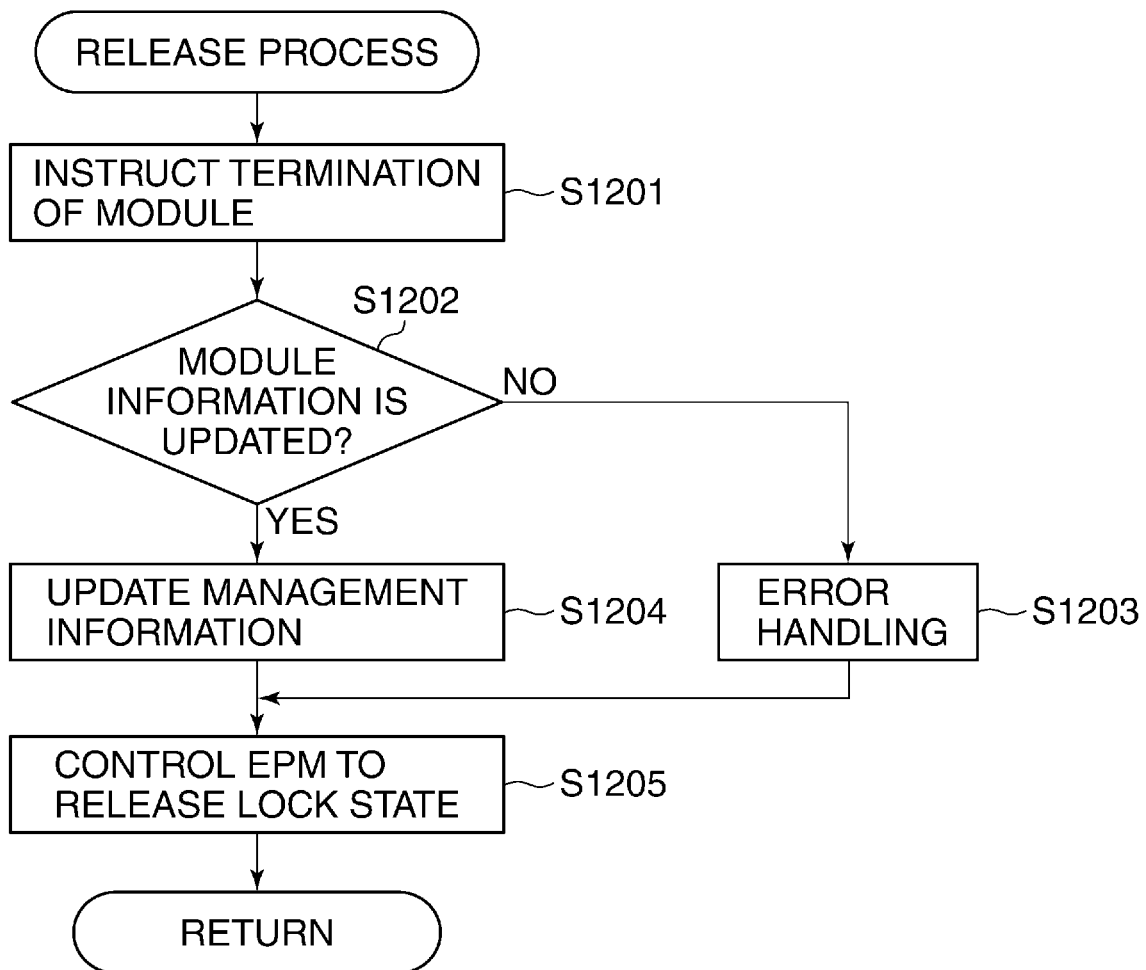
FIG. 7 is a flowchart showing detailed procedures of a release process executed in step S1107 in FIG. 6.

FIG. 7 is a flowchart showing detailed procedures of the release process executed in the step S1107 in FIG. 6.

In step S1201 in FIG. 7, the application control circuit 210 instructs termination of a module by sending a message that instructs the termination of a function of the module that a user designates to detach (hereinafter referred to as a "release target module") to the system control circuit 110. Next, the application control circuit 210 proceeds with the process to step S1202, and determines whether module information about the release target module has been updated by determining whether an information update message sent from the system control circuit 110 has been received.

When it is determined that the module information has not been updated in the step S1202, the application control circuit 210 executes a predetermined error handling in step S1203. After that, the application control circuit 210 releases the lock of the release target module by controlling the EPM in step S1205, and finishes this process. The error handling in the step S1203 may notify a user of an error content by displaying on the display operation module 300.

When it is determined that the module information has been updated in the step S1202, the application control circuit 210 proceeds with the process to step S1204, and updates the management information stored in the predetermined regions of the nonvolatile memory 214 and the memory 212 that the OS and kernel manage according to the contents of the received information update message. The management information includes module management information, EPM control management information, and RF bus configuration management information. After that, the application control circuit 210 releases the lock of the release target module by controlling the EPM in step S1215, and finishes this process.

Figure 8:
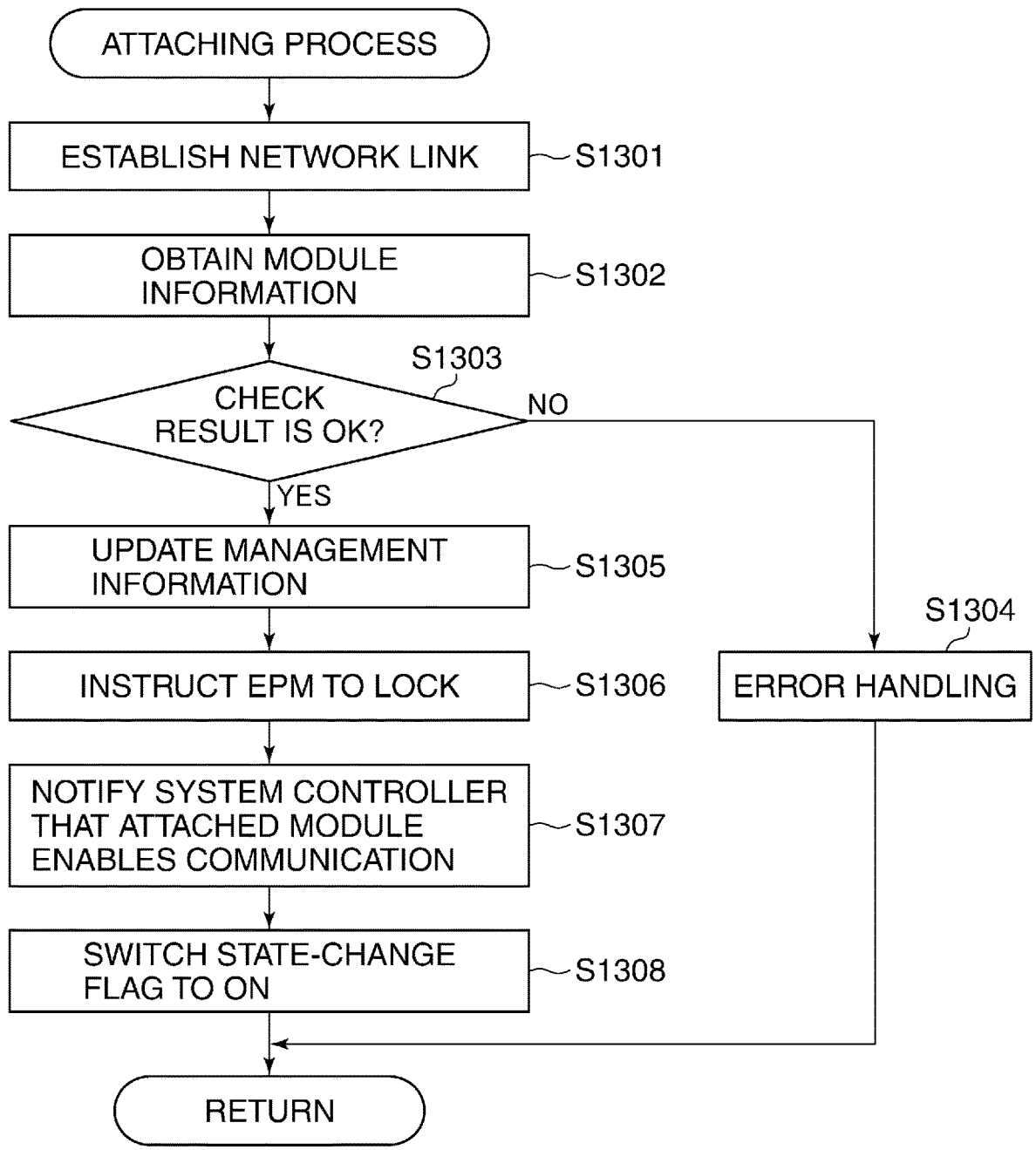
FIG. 8 is a flowchart showing detailed procedures of an attaching process executed in step S1109 in FIG. 6.

FIG. 8 is a flowchart showing detailed procedures of the attaching process executed in the step S1109 in FIG. 6.

In step S1301 in FIG. 8, the application control circuit 210 sets up the connection of message communication in cooperation with the system control circuit 110, and establishes a network link with the system control circuit 110. Next, the application control circuit 210 proceeds with the process to step S1302, and obtains the module information from the modules (henceforth a "attached module") attached to the body of the smart device 50 through the system control circuit 110. Furthermore, the application control circuit 210 proceeds with the process to step S1303, and verifies whether contents of the module information obtained in the step S1302 have no problem for the smart device 50. For example, the application control circuit 210 verifies whether the stable communication is available, whether the device is operatable with the voltage of the power supply module 400 that has been already provided, and whether a standard specification is satisfied in a case where the standard specification is individually set up in the smart device 50.

When the result verified in the step S1303 has a problem, the application control circuit 210 finishes this process about the attached module after executing a predetermined error handling in step S1304. The error handling may notify a user of an error content by displaying on the display operation module 300.

In the meantime, when the result verified in the step S1303 has no problem, it is determined that the attached module is normal, and the process proceeds to the step S1305. In the step S1305, the application control circuit 210 updates the management information stored in the predetermined regions of the nonvolatile memory 214 and the memory 212 on the basis of the module information about the attached module.

In the next step S1306, the application control circuit 210 instructs the EPM of the attached module to lock by sending an EPM lock instruction massage to the system control circuit 110. Thereby, the attached module is fixed and locked to the body of the smart device 50 by the EPM.

In the next step S1307, the application control circuit 210 sends a communication start instruction message toward the system control circuit 110, and reports that the message communication with the attached module that is subjected to the series of initialization process became available. After that, in step S1308, a state change flag is switched to ON and this process is finished. The state change flag is assigned to each module and is held in the nonvolatile memory 214, and is a rework flag that is switched between ON and OFF according to the change of state of each module. The state change flag turns ON when a state of each module that is attached to the body of the smart device 50 changes under the state where the state change flag of the module is OFF. In addition, a change of state includes a change of battery residue, a breakdown, performance degradation, other than attachment of each module. Moreover, when a temperature change measured by the temperature sensor 118 of the body of the smart device 50 exceeds a certain threshold, or when a humidity change measured by a moisture sensor that is not shown in FIG. 5 exceeds a certain threshold, the state change flags for all the modules are set to ON.

As a result of this process, when an attached module is normal (YES in the step S1303), and when the attached module is locked (step S1306), functions of the attached module become available in the smart device 50.

In addition, the attaching process of the present invention is not necessarily limited to the procedures shown in FIG. 8. For example, the attached module may be locked by the EPM before the step S1301 in order to stabilize the communication. In such a case, when there is a problem in the verification result in the step S1303, the lock is released after the step S1304.

Figure 9:
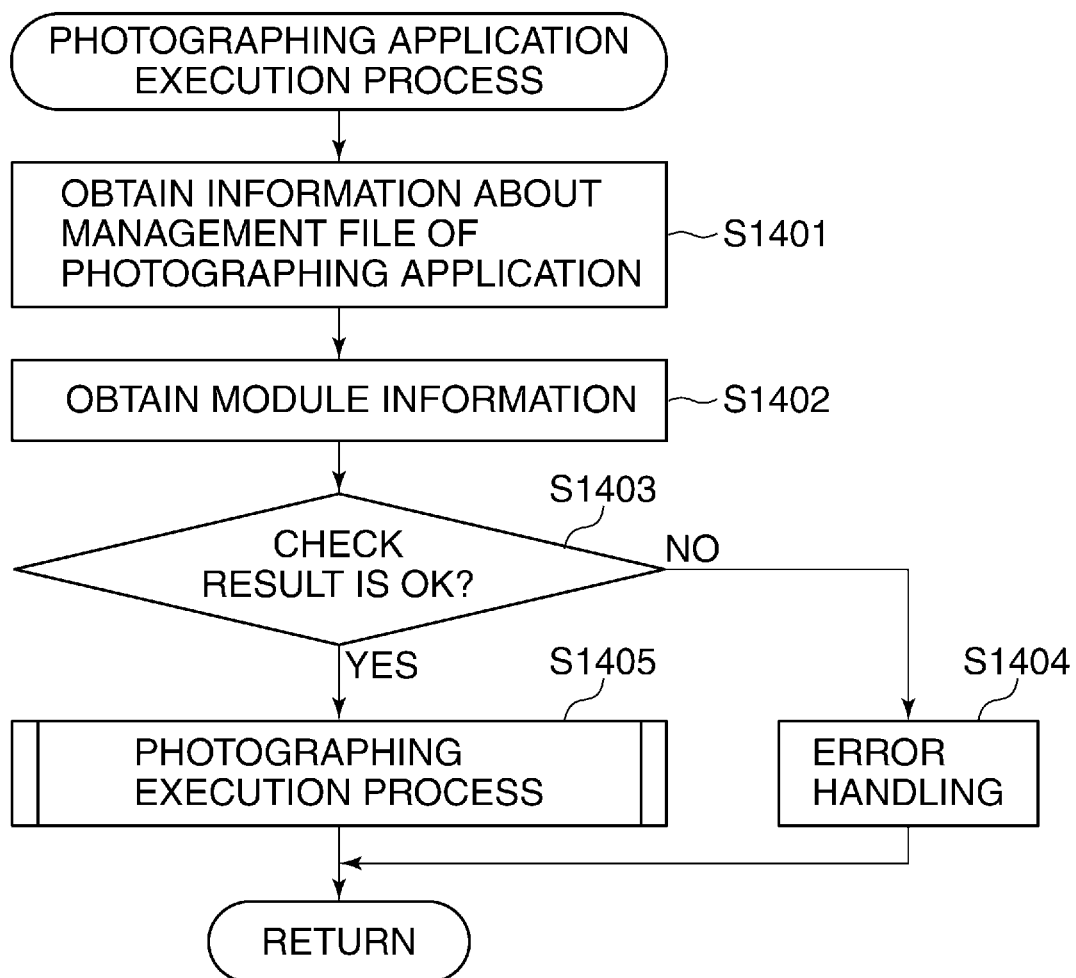
FIG. 9 is a flowchart showing detailed procedures of a photography application program execution process that is an example of an application program execution process executed in step S1111 in FIG. 6.

FIG. 9 is a flowchart showing detailed procedures of the photographing application execution process that is an example of the application program execution process executed in the step S1111 in FIG. 6.

When the photographing application is started in response to an input operation to the display operation module 300, the application control circuit 210 obtains the information about the management file of the photographing application from the management table 290 in step S1401. The information includes types of indispensable modules for running the photographing application, a combination of applicable modules that utilizes the photographing function at the maximum, and an optimal positional relationship between the slots to which the modules are attached.

Next, the application control circuit 210 proceeds with the process to step S1402, and obtains module information from each module through the system control circuit 110. Then, the application control circuit 210 verifies whether necessary modules are attached and whether there is a problem in the combination of the modules on the basis of the information about the management file of the photographing application in step S1403.

When the result verified in the step S1403 has a problem, the application control circuit 210 finishes the photographing application execution process after executing a predetermined error handling in step S1404. The error handling may notify a user of an error content by displaying on the display operation module 300. For example, when no slot is equipped with a photographing module at the time point of the step S1402 and the photographing application cannot be executed, an error content is notified in the error handling in the step S1404, and the photographing application execution process is finished. Moreover, when the posture detection module 800 is not attached, a camera shake is undetectable. In such a case, the image stabilization (IS) is not available even if the attached photographing module 500 has the IS function, Accordingly, a part of the photographing functions is restricted in the error handling in the step S1404. In this case, it is not necessary to finish the photographing application execution process. When a user's input operation is received in response to a notice of an error content, the process may be shifted to a photographing execution process in the step S1405 depending on a situation.

If there is no problem in the result verified in the step S1403, the process proceeds to the step S1405 and the photographing execution process is executed. After that, the application control circuit 210 stops the operations of the modules required for the photographing application, and finishes this process.

Figure 10:
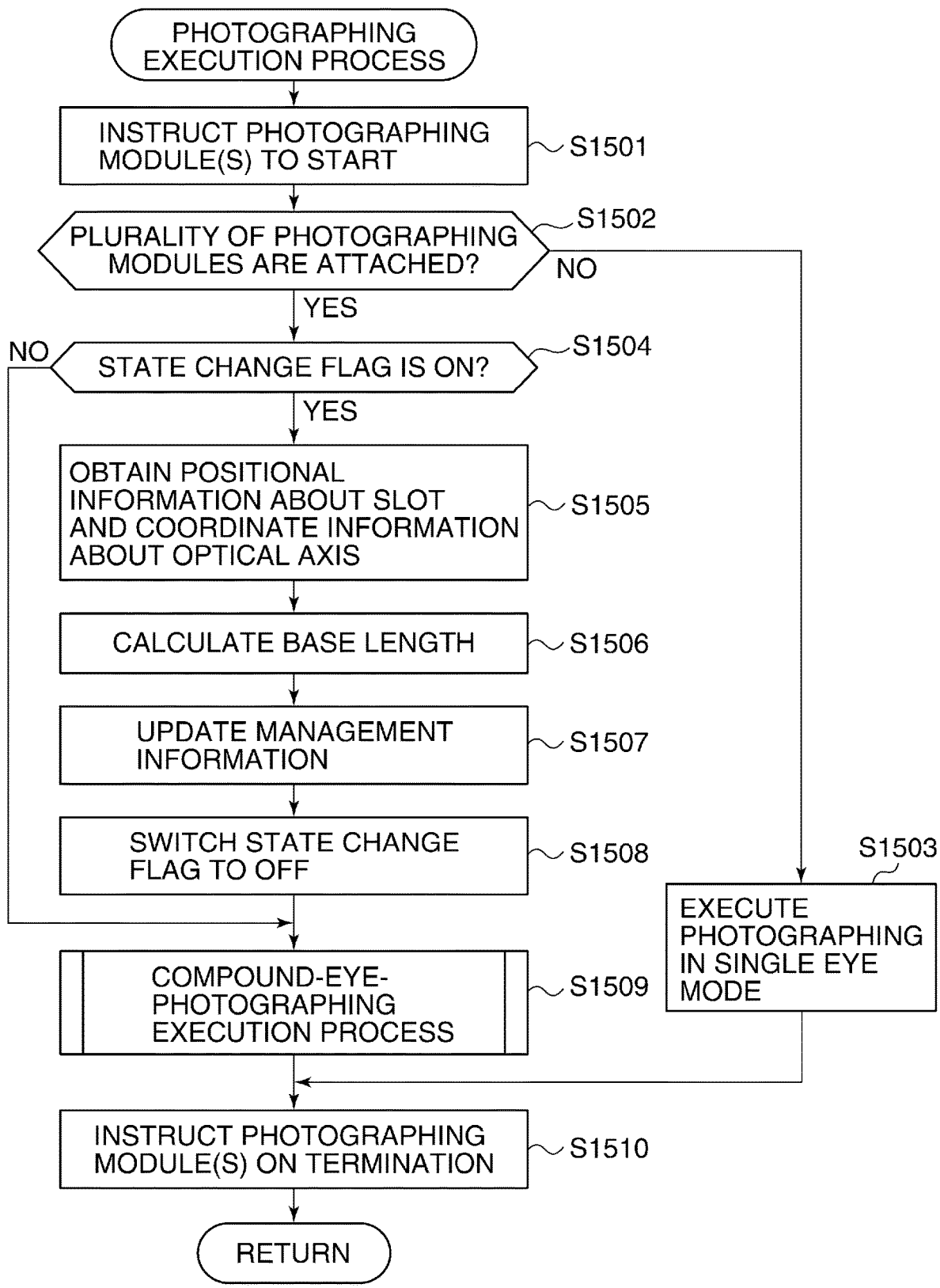
FIG. 10 is a flowchart showing procedures of a photographing execution process executed in step S1405 in FIG. 9.

FIG. 10 is a flowchart showing procedures of the photographing execution process executed in the step S1405 in FIG. 9.

In step S1501 in FIG. 10, the application control circuit 210 instructs the photographing module to start by sending a photographing-module start instruction message to the system control circuit 110. When receiving the photographing-module start instruction message through the system control circuit 110, the attached photographing modules (the photographing modules 500 and 600 in the first embodiment) complete a photographing preparation by executing a reset operation.

In the next step S1502, the application control circuit 210 determines whether a plurality of photographing modules are attached on the basis of the module information obtained in the step S1402 in FIG. 9. When only one photographing module is attached, the process proceeds to step S1503. For example, when only the photographing module 500 is attached, the application control circuit 210 executes the general photographing in a single eye mode using the camera 510, and proceeds with the process to step S1510. The general photographing means obtaining desired image data from the image sensor while performing the automatic exposure control (AE), automatic focusing (AF), automatic white balance (AWB), and image stabilization (IS). In addition, the present invention does not limit contents of the general photographing. Since the contents have been already known in prior art documents, the detailed description is omitted.

When determining that a plurality of photographing modules are attached in the step S1502, the application control circuit 210 proceeds with the process to step S1504, and determines whether one of the state change flags is set to ON in order to detect whether the state of each of the attached photographing modules has been changed. When all the state change flags are OFF, the process proceeds to step S1509. For example, when the photographing modules 500 and 600 are attached, the application control circuit 210 finishes this process after performing a compound-eye-photographing execution process with the cameras 510 and 610. In addition, the compound-eye-photographing execution process will be described later in detail with reference to FIG. 11.

As a result of the determination in the step S1504, when either of the state change flags for the attached photographing modules (for example, the photographing modules 500 and 600) is set to ON, the process proceeds to step S1505.

In the step S1505, the application control circuit 210 obtains the positional information about each slot and the coordinate information about each optical axis. The positional information about each slot is obtained from the memory 114 of the body of the smart device 50. Similarly, the coordinate information about the optical axis of the camera 510 is obtained from the nonvolatile memory 522 of the photographing module 500, and the coordinate information about the optical axis of the camera 610 is obtained from the nonvolatile memory 622 of the photographing module 600.

Next, the application control circuit 210 proceeds with the process to step S1506, and calculates a base length that is a distance between the optical axis of the camera 510 and the optical axis of the camera 610. It is important to obtain a correct base length in order that at least two photographing modules exhibit the functions of the compound eye camera. In addition, the base length is a variable used for processing the parallax information between at least two photographing modules in the present invention, and shows the distance between the two optical axes. The base length is expressed as a deviation amount or parallax in prior art documents. Details of the calculation method for the base length in this embodiment will be mentioned later.

In the following step S1507, the application control circuit 210 updates the management information about the base length calculated in the step S1506 and the management information stored in the predetermined regions of the nonvolatile memory 214 and the memory 212. The management information includes module management information, EPM control management information, and RF bus configuration management information other than the management information about the base length newly obtained in the step S1506.

After that, the application control circuit 210 proceeds with the process to step S1508, and switches the state change flag to OFF. The state change flag becomes ON at a timing at which a new module is attached to the body of the smart device 50 in the step S1308 in the attaching process in FIG. 8, for example. In the meantime, the state change flag becomes OFF at a timing immediately after updating the management file to the up-to-date state in the step S1508, for example. Thus, a state change of a module is always managed by switching ON and OFF of a state change flag at a suitable timing in the first embodiment.

Next, the application control circuit 210 proceeds with the process to the step S1509, and performs the compound-eye-photographing execution process for photographing in the compound eye mode with the cameras 510 and 610.

In the final step S1510, the application control circuit 210 sends a photographing-module-termination-instruction message to the system control circuit 110, and finishes this process. When receiving the photographing-module-termination-instruction message, the system control circuit 110 changes the setting of the electric power supplied for the photographing modules 500 and 600 into the low power consumption through the power control circuit 220.

Figure 11:
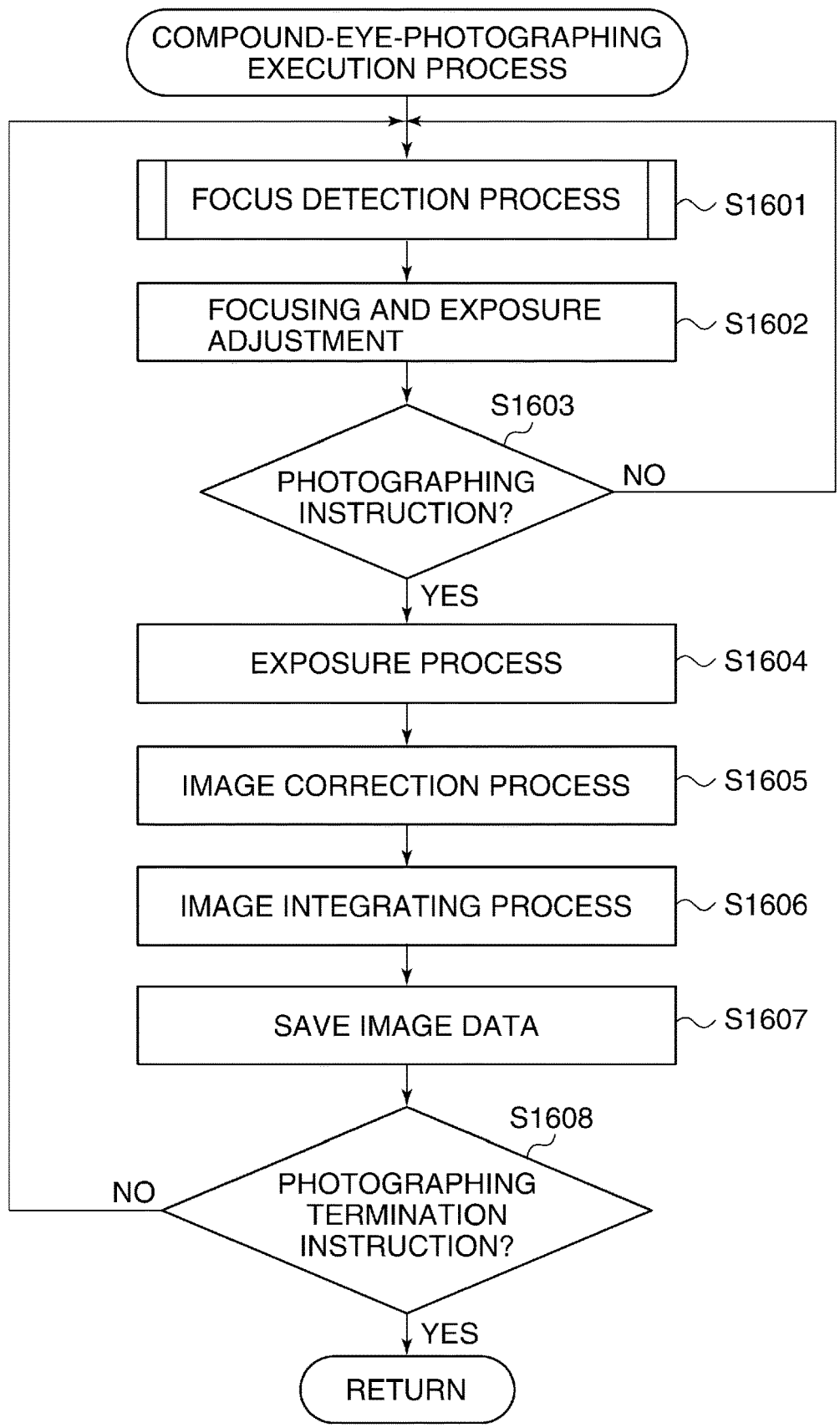
FIG. 11 is a flowchart showing procedures of a compound eye photographing execution process executed in step S1509 in FIG. 10.

FIG. 11 is a flowchart showing procedures of the compound-eye-photographing execution process executed in the step S1509 in FIG. 10.

First, in step S1601 in FIG. 11, the application control circuit 210 controls the photographing modules 500 and 600 simultaneously to perform a focus detection process in order to obtain a defocus amount. Details of the focus detection process will be described later with reference to FIG. 12.

Next, the application control circuit 210 proceeds with the process to step S1602, and performs the focusing on the basis of the defocus amount obtained in the step S1601 and adjusts the exposure by setting up an aperture, shutter speed, and sensitivity of the image sensor optimally. The focus detection process in the step S1601 and the focusing and exposure adjustment in the step S1602 are repeated until a user instructs photographing by the TP/button 314 in the following step S1603. The display operation control circuit 310 sends a photographing instruction message toward the application control circuit 210 in response to a user's photographing instruction message.

When receiving the photographing instruction message in the step S1603, the application control circuit 210 proceeds with the process to step S1604. In the step S1604, the photographing modules 500 and 600 execute exposure processes and output image data generated by the photoelectric conversion of the imaging sensors, respectively. The image data output in the step S1604 are corrected in step S1605. Noise is removed or distortion is corrected in the correction of the image data, for example. Moreover, transformation or movement of images enables to correct mutual inclination or unintended positional displacement of the images. Ideally, it is preferable that the optical axes of the photographing modules 500 and 600 are parallel. However, it is difficult to avoid a manufacture error due to lack of accuracy of parts or assembling. The manufacture errors of the photographing modules 500 and 600 are electronically corrected by transformation or movement of the images in the step S1605. This enables improvement of the accuracy of the image composite function or the measurement function mentioned later.

Next, the application control circuit 210 proceeds with the process to step S1606, and performs an integrating process for the image data corrected in the step S1605. In the smart device 50 of the present invention, the viewpoints of the photographing modules 500 and 600 differ mutually, and there is slight parallax. Accordingly, if images are integrated into one image by combining pixels of the images with sub pixel precision, the image of which resolution is higher than that of an image obtained by the single eye mode is generable.

Moreover, when a depth of field of the camera with the photographing lens is shallow, a high resolution is obtained about a focused object, but defocus occurs about an object located at a position different from a focused position in a depth direction. In order to solve this problem, the focused positions of the photographing modules 500 and 600 may be deviated slightly in the step S1602, and the focused positions of two images may be combined with the sub pixel precision in the step S1606. This deepens the depth of field in the entire screen and increases the resolution. In addition, an image process that emphasizes defocus by shallowing the depth of field and an image process that intentionally moves a focused position are available in the compound-eye-photographing execution process, Furthermore, if the settings of the exposures of the photographing modules 500 and 600 are deviated slightly in a similar manner to the focusing in the step S1602, the dynamic range of the entire image is expandable. In addition, the present invention does not limit a control method of the image integrating process. Since the method has been already known in prior art documents, the detailed individual description is omitted.

After generating the desired image data in the step S1606, the application control circuit 210 proceeds with the process to step S1607 and saves the image data generated into the recording module 150. After finishing the step S1607, the process proceeds to step S1608. When the user does not input a photographing termination instruction in the step S1608 until a predetermined time elapses after the procedure in the step S1607, the process returns to the step S1601 and the compound-eye-photographing execution process is repeated.

When the user inputs the photographing termination instruction in the step S1608, the display operation control circuit 310 sends a photographing termination instruction message towards the application control circuit 210. When receiving the photographing termination instruction message, the application control circuit 210 stops the photographing modules 500 and 600, and finishes this process.

Figure 12:
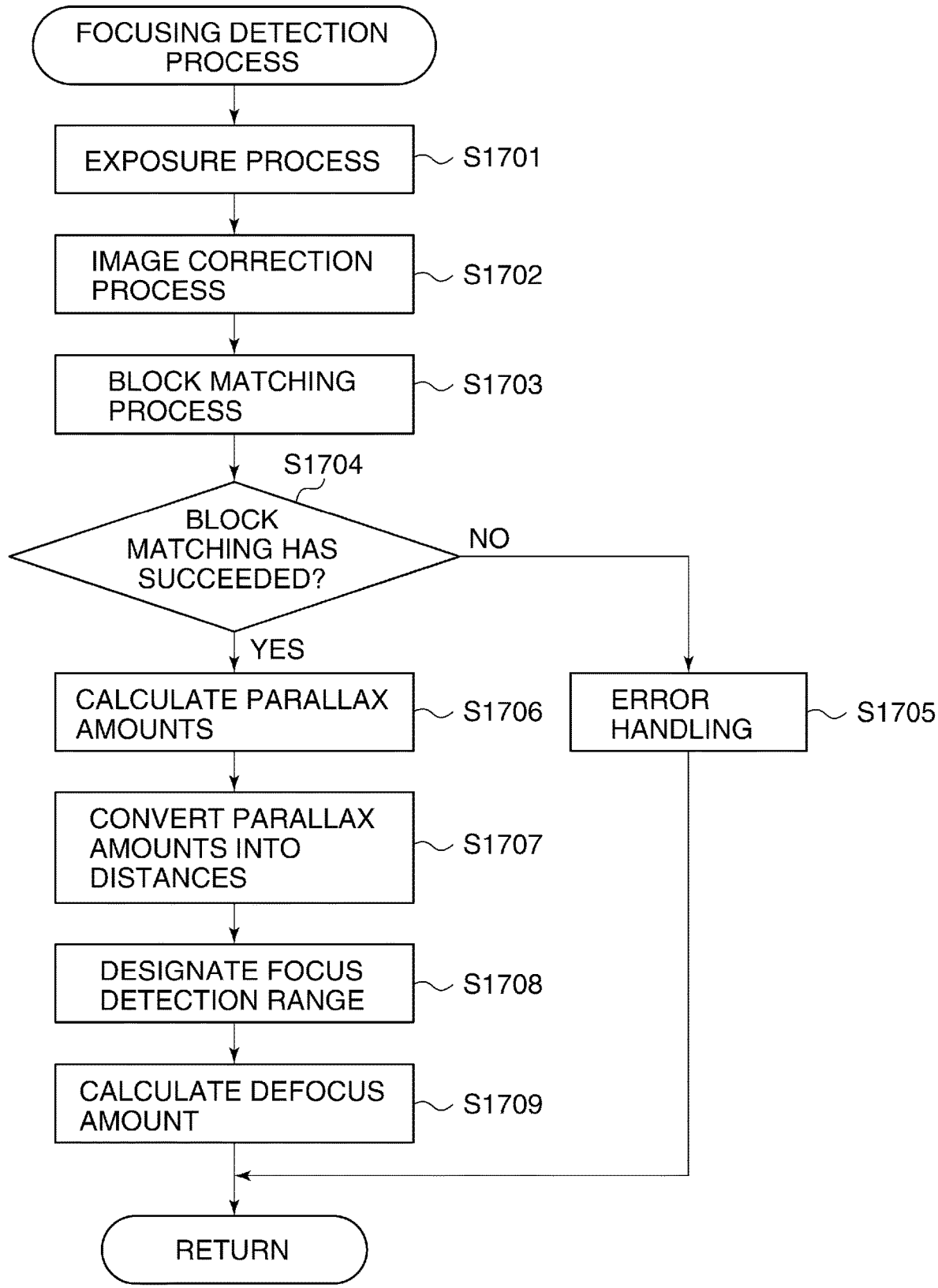
FIG. 12 is a flowchart showing procedures of a focus detection process executed in step S1601 in FIG. 11.

FIG. 12 is a flowchart showing procedures of the focus detection process executed in the step S1601 in FIG. 11.

First, the application control circuit 210 controls the photographing modules 500 and 600 simultaneously to perform the exposure processes in step S1701 in FIG. 12, and executes a correction process for the obtained image data in step S1702. Since the contents of the steps S1701 and S1702 are similar to the contents of the steps S1604 and S1605 that are mentioned above with reference to FIG. 11, respectively, their detailed descriptions are omitted.

Next, the application control circuit 210 proceeds with the process to step S1703, and executes a block matching process.

Block matching is an algorithm that finds corresponding positions from two images of which viewpoints differ. The block matching can be simply described as follows. It is a method for finding coordinates corresponding to a specified part (a peak of an edge, for example) of the same object from the two images. One image is divided into small area regions and the other image is searched for the corresponding coordinate for every region. Specifically, optional regions are segmented from the images compared and an evaluation value is calculated in order to evaluate a similarity between the images in the block matching process. The evaluation value to be calculated may be an SAD (Sum of Absolute Difference) of luminance differences in the segmented regions or an SSD (Sum of Squared Difference) of the luminance differences. Moreover, a ZNCC (Zero-mean Normalized Cross-Correlation) may be calculated as the evaluation value.

If an object is indistinct and has little difference in brightness or if a distance to an object is too close as compared with the base length, the same specified part is not found in images. In such a case, the block matching process in the step S1703 may fail. Accordingly, when it is determined that the block matching process has failed (NO in the step S1704), the application control circuit 210 proceeds with the process to step S1705, and executes a predetermined error handling. The error handling may notify a user of an error content by displaying on the display operation module 300.

In the meantime, when it is determined that the block matching process has succeeded in the step S1704, the application control circuit 210 proceeds with the process to step S1706, and calculates parallax amounts on an image surface over the entire screen. A parallax amount in this embodiment is calculated on the basis of a deviation amount between a coordinate of a specific part in one image and a coordinate of the specific part in the other image that are correlated by the block matching process. After that, the application control circuit 210 proceeds with the process to step S1707, and converts the parallax amounts on the image surface calculated in the step S1706 into distances.

The easiest method of converting a parallax amount on the image surface into a distance uses the following calculation formula shown as Formula 1. A symbol "Z" denotes a distance to an object, a symbol "L" denotes the base length between the photographing modules 500 and 600, a symbol "f" denotes a focal length of the cameras 510 and 610, and a symbol "d" denotes a parallax amount. In addition, it is assumed that there are two photographing modules and that the cameras have the same focal length in order to simplify the description in this example, but the present invention is not limited to this.

$$Z = L \cdot f / d \quad (1)$$

After converting the parallax amounts on the image surface into the distances over the entire screen and generating a distance map in the step S1707, a focus detection range is designated so as to include a desired object in step S1708. The focus detection range is generally designated by a user's operation, such as designation of a movable focus detection frame displayed on the LCD panel 312. Alternatively, the application control circuit 210 may automatically designate the focus detection range by detecting a feature point of an object, such as a human face.

When the focus detection range is designated in the step S1708, a target object becomes clear, and the region to be referred in the distance map generated in the step S1707 is determined uniquely. Then, a difference between a target focused position on the distance map and the current focused position determined by an actual position of the focusing lens is calculated as a defocus amount in step S1709. Each of the photographing modules 500 and 600 of this embodiment calculates the moving amount of the focusing lens on the basis of the defocus amount, and performs the focusing mentioned above in the step S1602 in FIG. 11. Then, the focus detection process finishes.

The description about a series of operations of the smart device 50 has been completed. In addition, the management table 290 provided in the application program control module 200 shown in FIG. 5 is able to update the information when an application program is updated by another module, such as the wireless LAN module 700. Accordingly, a type and an attainable function of each module and other needed information may be added to the management table 290 in FIG. 5, and may be changed suitably.

Figure 13:
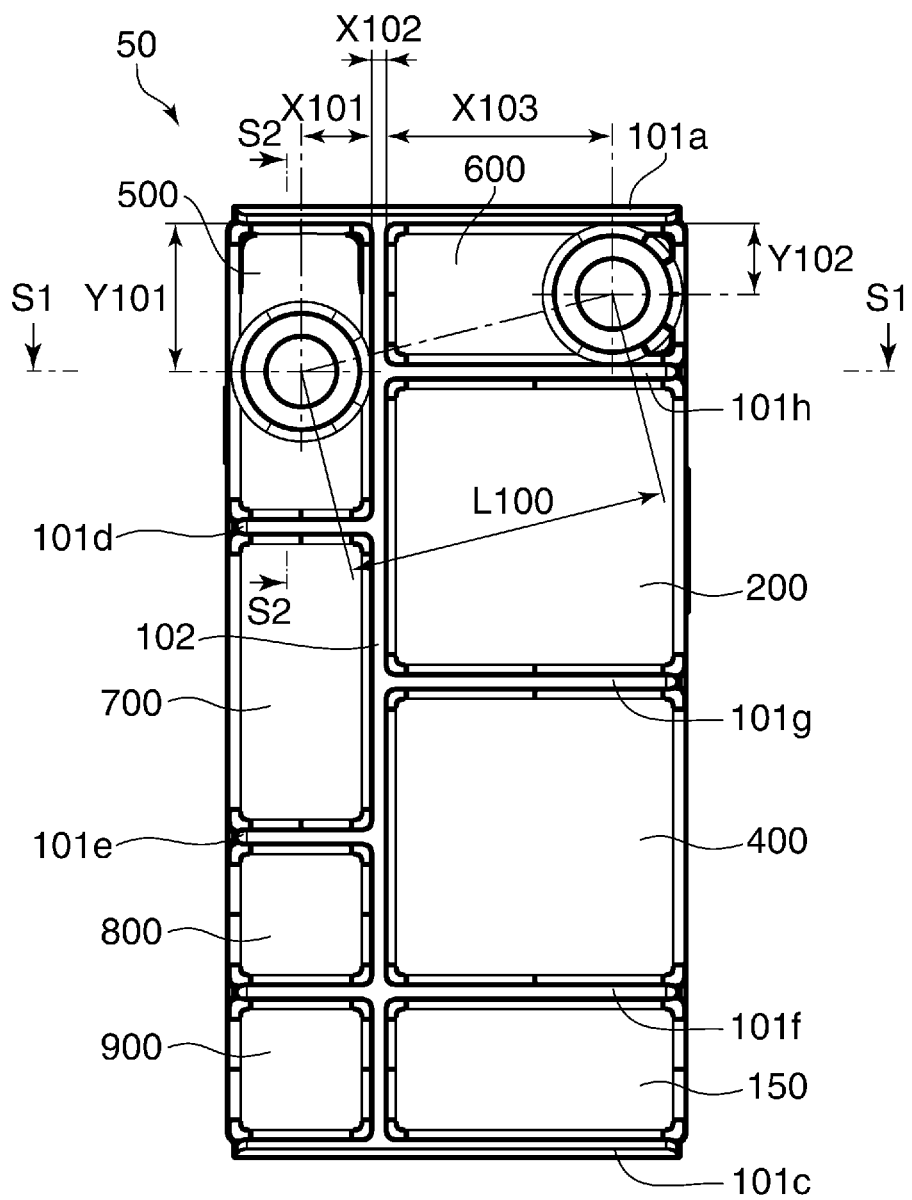
FIG. 13 is an explanation view showing a calculation method of a base length executed in step S1506 in FIG. 10.

FIG. 13 is an explanation view showing a calculation method of the base length executed in the step S1506 in FIG. 10.

In the step S1506 in FIG. 10 mentioned above, the application control circuit 210 obtains the positional information about the slots from the memory 114 of the body of the smart device 50. The positional information about the slots in the first embodiment includes the positional information about the slots 1500 and 1600, and specifies the positions of the butting surfaces of the ribs 101a, 101c through 101h and the spine 102 that determine positions of modules. Simultaneously, the application control circuit 210 obtains coordinate information about the optical axis of the camera 510 from the nonvolatile memory 522 of the photographing module 500 in the step S1506. Moreover, the application control circuit 210 obtains coordinate information about the optical axis of the camera 610 from the nonvolatile memory 622 of the photographing module 600. The coordinate information about the optical axes in the first embodiment specifies the coordinates of the optical axes based on the contours of the photographing modules 500 and 600.

Specifically, the application control circuit 210 obtains numeric values X101, X102, X103, Y101, and Y102 shown in FIG. 13 on the basis of the positions and the coordinate information. The value X101 denotes a horizontal length from the butting surface of the photographing module 500 to the optical axis of the camera 510, and the value Y101 denotes a vertical length thereof. The value X102 denotes a horizontal length of the spine 102 in the body of the smart device 50. The value X103 denotes a horizontal length from the butting surface of the photographing module 600 to the optical axis of the camera 610, and the value Y102 denotes a vertical length thereof.

A length (base length) L100 of a straight line that connects the optical axis of the camera 510 and the optical axis of the camera 610 is calculated from X101, X102, X103, Y101, and Y102 according to the following calculation formula shown as Formula 2.

$$L100 = \sqrt{\{(X101 + X102 + X103)^2 + (Y101 - Y102)^2\}} \quad (2)$$

As mentioned above, since the calculation formula is comparatively simple, memory capacity required for the memory 212 and the nonvolatile memory 214 of the application program control module 200 is comparatively little. Furthermore, since the processing speed of the application control circuit 210 is extremely high, there is no possibility of producing a time lag until focusing or exposure start.

Figure 14A:
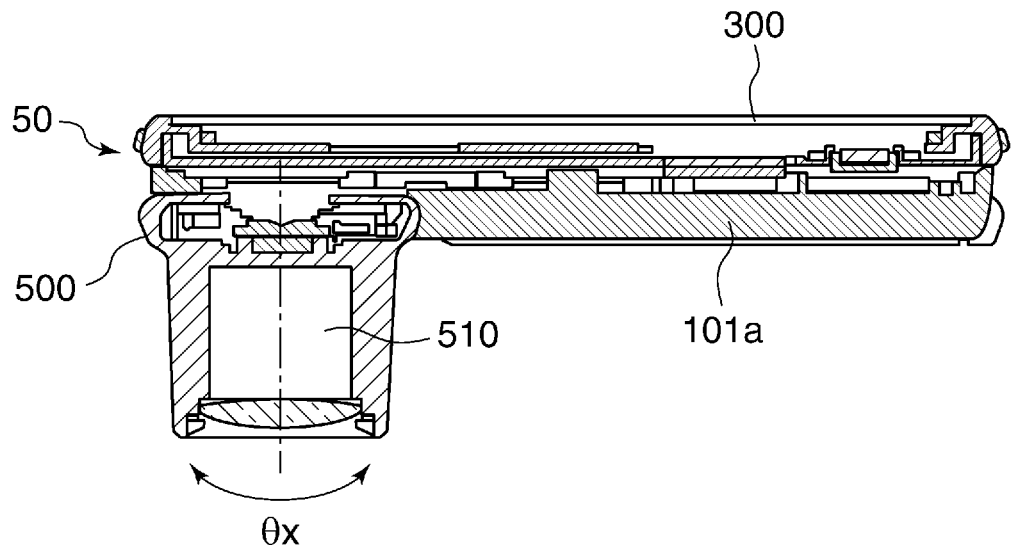
FIG. 14A and FIG. 14B are explanation views showing an inclination of an optical axis of a photographing module against the body of the smart device according to the first embodiment.
Figure 14B:
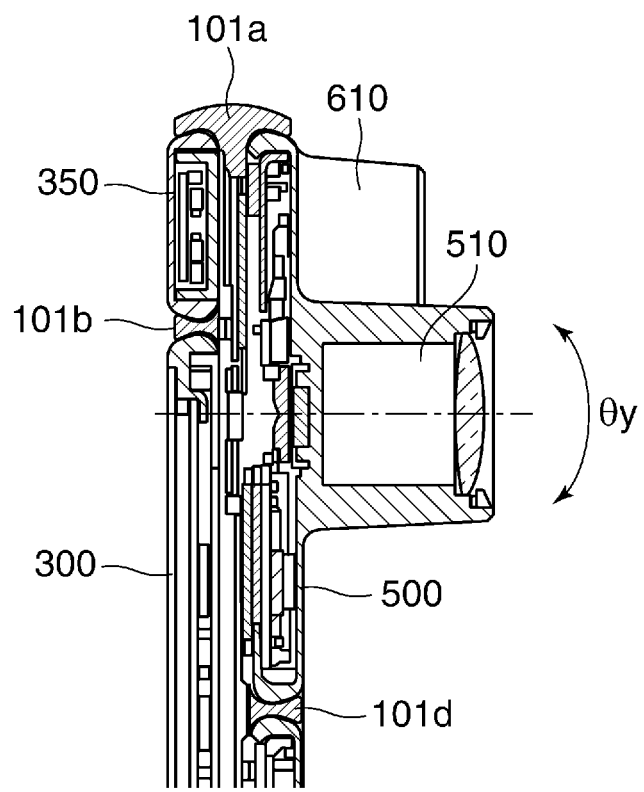

FIG. 14A and FIG. 14B are explanation views showing an inclination of the optical axis of the photographing module 500 against the body of the smart device 50 according to the first embodiment. FIG. 14A shows a section of FIG. 13 in a case where the photographing module 500 is divided in the horizontal direction, and is a sectional view taken along the line S1-S1 that passes the optical axis of the camera 510. In the meantime, FIG. 14B is a section of FIG. 13 in a case where the photographing module 500 is divided in the vertical direction, and is a sectional view taken along the line S2-S2 that passes the optical axis of the camera 510. In addition, the horizontal direction in FIG. 14A and FIG. 14B means the longitudinal direction of the ribs 101a through 101h. The vertical direction means the longitudinal direction of the spine 102 (not shown in FIG. 14A and FIG. 14B).

A symbol θx shown in FIG. 14A schematically denotes a horizontal tilt angle of the optical axis of the camera 510, and a symbol θy shown in FIG. 14B schematically denotes a vertical tilt angle of the optical axis of the camera 510. As mentioned above, it is preferable that the slots 1500 and 1600 are in an approximately same plane and that the optical axes of the cameras 510 and 610 are approximately parallel in the body of the smart device 50, However, since an manufacture error due to lack of accuracy of parts or assembling is unavoidable, the minute components of the horizontal tilt angle θx and vertical tilt angle θy remain even if positions of parts, such as lenses, are corrected in a manufacturing process In addition, although FIG. 14A and FIG. 14B show the inclination of the optical axis of the camera 510, such a manufacture error occurs also in the camera 610.

Accordingly, the manufacture errors of the photographing modules 500 and 600 are measured in the manufacturing process in the first embodiment. The inclinations of the optical axes of the cameras 510 and 610 as the measurement results are respectively stored into the nonvolatile memory 522 of the photographing module 500 and the nonvolatile memory 622 of the photographing module 600. This enables the application control circuit 210 to transform or move an image so as to approximate to an ideal image while taking the errors into consideration, when correcting image data in the step S1605 in FIG. 11 and the step S1702 in FIG. 12. Thus, the first embodiment improves the accuracy of the image composite function or the measurement function when the functions of the compound eye camera are used. In addition, since the concrete method of correcting an error on the basis of the inclinations of the optical axes of the cameras 510 and 610 is disclosed in JP3792832B mentioned above, detailed individual descriptions are omitted.

Hereinafter, a second embodiment that is different from the first embodiment only in the combination of the slots to which the modules are attached will be described.

Figure 15:
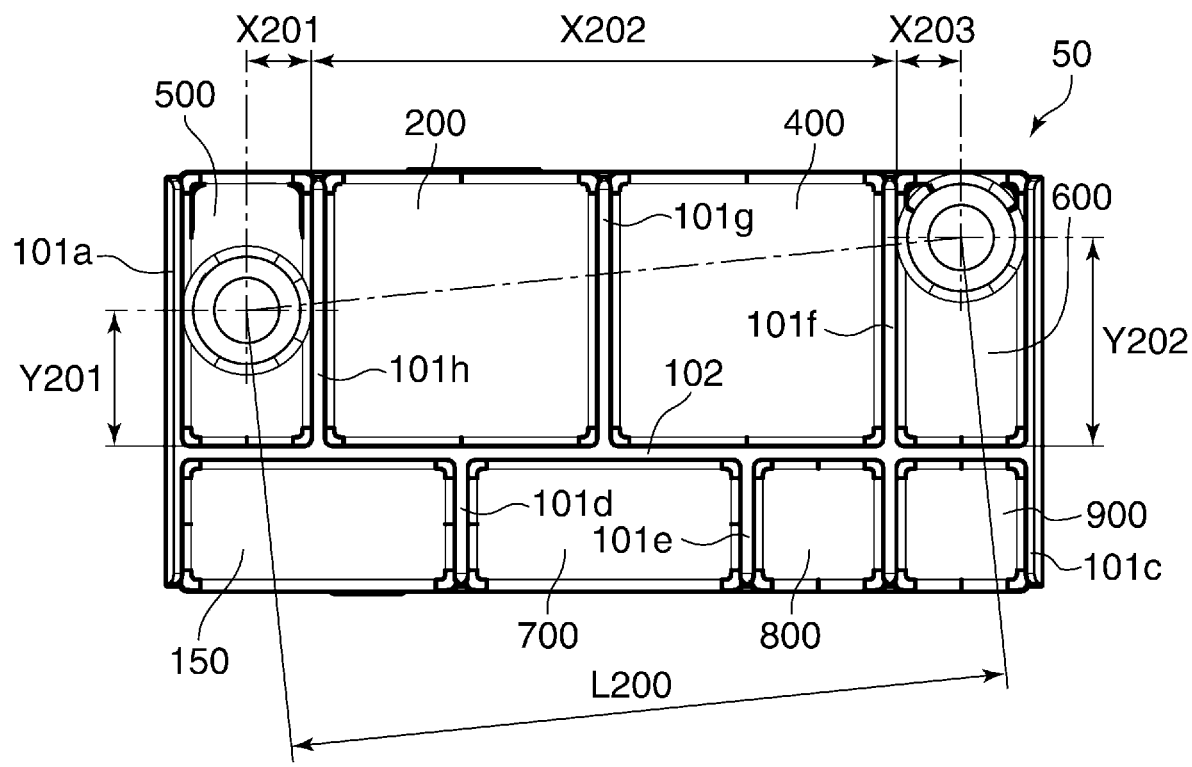
FIG. 15 is an explanation view showing a calculation method of a base length according to a second embodiment executed in the step S1506 in FIG. 10.

FIG. 15 is an external view showing the smart device 50 as an electronic apparatus according to the second embodiment, and is an explanation view showing a base-length's calculation method executed in the step S1506 in FIG. 10.

Unlike the first embodiment, in the second embodiment, the photographing modules 500 and 600 are respectively attached to the slots 1600 and 1100 in the back side of the body of the smart device 50. Then, in this embodiment, the recording module 150 is attached to the slot 1500 to which the photographing module 500 was attached in the first embodiment. This enables to arrange the optical axis of the camera 510 farther away from the optical axis of the camera 610, and enables to lengthen the base length. In general, the longer base length is effective to obtain a cubic effect when a long-distance object is photographed in the stereoscopic view mode, and improves a focus detection accuracy. Moreover, the positional relationship with such photographing modules 500 and 600 may be changed by considering handling feeling of a user who uses the smart device 50.

In the step S1506 in FIG. 10 mentioned above, the application control circuit 210 obtains the positional information about the slots from the memory 114 of the body of the smart device 50. The positional information about the slots in the second embodiment includes the positional information about the slots 1500, 1600, and 1800, and specifies the positions of the butting surfaces of the ribs 101a through 101h and the spine 102 that determine positions of modules. Simultaneously, the application control circuit 210 obtains coordinate information about the optical axis of the camera 510 from the nonvolatile memory 522 of the photographing module 500 in the step S1506. Moreover, the application control circuit 210 obtains coordinate information about the optical axis of the camera 610 from the nonvolatile memory 622 of the photographing module 600. The coordinate information about the optical axes in the second embodiment specifies the coordinates of the optical axes based on the contours of the photographing modules 500 and 600.

Specifically, the application control circuit 210 obtains numeric values X201, X202, X203, Y201, and Y202 shown in FIG. 15 on the basis of the positions and the coordinate information. The value X201 denotes a horizontal length from the butting surface of the photographing module 500 to the optical axis of the camera 510, and the value Y201 denotes a vertical length thereof. The value X202 denotes a horizontal length between the ribs 101f and 101h in the body of the smart device 50. The value X203 denotes a horizontal length from the butting surface of the photographing module 600 to the optical axis of the camera 610, and the value Y202 denotes a vertical length thereof.

In FIG. 15, a length (base length) L200 of a centerline that connects the optical axis of the camera 510 and the optical axis of the camera 610 is calculated from X201, X202, X203, Y201, and Y202 according to the following calculation formula shown as Formula 3.

$$L200=\sqrt{\{(X201+X202+X203)^2+(Y201-Y202)^2\}} \quad (3)$$

As mentioned above, since the calculation formula is comparatively simple, memory capacity required for the memory 212 and the nonvolatile memory 214 of the application program control module 200 is comparatively little. Furthermore, since the processing speed of the application control circuit 210 is extremely high, there is no possibility of producing a time lag until focusing or exposure start.

The other preferable embodiment of the present invention has been described above with reference to FIG. 15. In addition, various modules can be attached to the body of the smart device 50 and a user freely selects a slot to which a module will be attached. The combination shown in FIG. 15 is a mere example, and the present invention does not limit the combination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-061112, filed Mar. 27, 2017, which is hereby incorporated by reference herein in its entirety.

What is claimed is:

1. An electronic apparatus comprising:
   first and second photographing modules that are respectively attached to any two of attachment regions of a body of the electronic apparatus;
   a photographing unit configured to photograph in a compound eye mode using the first and second photographing modules;
   a memory device that stores instructions; and
   at least one processor that executes the instructions to function as:
      an obtaining unit configured to obtain two pieces of coordinate information about optical axes of the first and second photographing modules from the first and second photographing modules;
      a storage unit configured to store positional information about the attachment regions; and
      a calculation unit configured to calculate a base length by obtaining the coordinate information about the optical axes and the positional information about the attachment regions in a case where one of a state of the first and second photographing modules and a state of the body of the electronic apparatus changes.

2. The electronic apparatus according to claim 1, wherein the compound eye mode in which images output from the first and second photographing modules are composited is selectable by a user in a case where the attachment regions are in an approximately same plane and the optical axes of the first and second photographing modules are approximately parallel.

3. The electronic apparatus according to claim 1, wherein the compound eye mode in which an object distance is calculated based on image data output from the first and second photographing modules is selectable by a user in a case where the attachment regions are in an approximately same plane and the optical axes of the first and second photographing modules are approximately parallel.

4. The electronic apparatus according to claim 1, wherein the obtaining unit further obtains error information about the optical axes from the first and second photographing modules, and wherein the obtaining unit corrects the image data output from the first and second photographing modules by obtaining the coordinate information about the optical axes, the error information about the optical axes, and the positional information about the attachment regions in a case where one of the state of the first and second photographing modules and the state of the body of the electronic apparatus changes.

5. The electronic apparatus according to claim 1, further comprising a detection unit configured to detect whether the first and second photographing modules are respectively attached to any two of the attachment regions,
   wherein the photographing unit photographs in the compound eye mode in a case where the detection unit detects that the first and second photographing modules are respectively attached to any two of the attachment regions.

6. The electronic apparatus according to claim 1, wherein the first and second photographing modules respectively have cameras that are different in arrangement and shape.

7. The electronic apparatus according to claim 1, further comprising:
   at least three attachment regions with different positional information.

8. The electronic apparatus according to claim 1, further comprising:
   permanent electromagnets that are respectively provided in the attachment regions at positions corresponding to magnetic bodies of the first and second photographing modules; and
   a polar change unit configured to change polarities of the permanent electromagnets individually,
   wherein the polar change unit changes the polarities of the permanent electromagnets individually, so that the first and second photographing modules are fixed to and released from the attachment regions.

9. The electronic apparatus according to claim 1, further comprising guide parts that divide the attachment regions,
   wherein the guide parts guide the first and second photographing modules to be attached to the attachment regions and hold the first and second photographing modules attached.

10. The electronic apparatus according to claim 1, wherein management information including information about the base length is updated in a case where the base length is calculated.

11. The electronic apparatus according to claim 1, wherein the first and second photographing modules comprise:
   a photographing lens;
   an image sensor configured to obtain image data by converting an object image formed with the photographing lens photoelectrically;
   a positioning part for positioning the image pickup apparatus to the body of the electronic apparatus; and
   a memory, which is accessible from the electronic apparatus, configured to store coordinate information about an optical axis of the photographing lens based on the positioning part.

12. A control method for an electronic apparatus in which first and second photographing modules are attached to any two of attachment regions, the control method comprising:
- photographing in a compound eye mode;
- obtaining two pieces of coordinate information about optical axes of the first and second photographing modules from the first and second photographing modules;
- storing positional information about the attachment regions; and
- calculating a base length by obtaining the coordinate information about the optical axes and the positional information about the attachment regions in a case where one of a state of the first and second photographing modules and a state of a body of the electronic apparatus changes.

13. A non-transitory computer-readable storage medium storing a control program causing a computer to execute a control method for an electronic apparatus in which first and second photographing modules are attached to any two of attachment regions, the control method comprising:
- photographing in a compound eye mode;
- obtaining two pieces of coordinate information about optical axes of the first and second photographing modules from the first and second photographing modules;
- storing positional information about the attachment regions; and
- calculating a base length by obtaining the coordinate information about the optical axes and the positional information about the attachment regions in a case where one of a state of the first and second photographing modules and a state of a body of the electronic apparatus changes.

* * * * *